(12) United States Patent
Nedungadi et al.

(10) Patent No.: US 11,716,255 B1
(45) Date of Patent: Aug. 1, 2023

(54) METHODS AND SYSTEMS FOR AUTOMATIC NETWORK TOPOLOGY DEVIATION DETECTION

(71) Applicant: Nile Global, Inc., San Jose, CA (US)

(72) Inventors: Promode Nedungadi, San Jose, CA (US); Suresh Katukam, Milpitas, CA (US); Ganesh Sundaram, Santa Clara, CA (US)

(73) Assignee: Nile Global, Inc., San Jose, CA (US)

( * ) Notice: Subject to any disclaimer, the term of this patent is extended or adjusted under 35 U.S.C. 154(b) by 0 days.

(21) Appl. No.: 17/578,364

(22) Filed: Jan. 18, 2022

(51) Int. Cl.
*G06F 15/177* (2006.01)
*H04L 41/12* (2022.01)
*H04L 41/0816* (2022.01)
*H04L 41/0869* (2022.01)
*H04L 41/0853* (2022.01)

(52) U.S. Cl.
CPC .......... *H04L 41/12* (2013.01); *H04L 41/0816* (2013.01); *H04L 41/0853* (2013.01); *H04L 41/0869* (2013.01)

(58) Field of Classification Search
CPC .................................................. H04L 41/0869
USPC ........................................................ 709/220
See application file for complete search history.

(56) References Cited

U.S. PATENT DOCUMENTS

| 11,153,168 B1* | 10/2021 | Dhamal Gopalarathnam ............ H04L 41/0806 |
| 2005/0243739 A1* | 11/2005 | Anderson ................ H04L 61/00 370/254 |
| 2008/0181136 A1* | 7/2008 | Watanabe ........... H04L 41/0873 370/254 |
| 2009/0077206 A1* | 3/2009 | Dunn .................... H04L 41/509 709/220 |
| 2009/0285127 A1 | 11/2009 | Black et al. |
| 2009/0307232 A1 | 12/2009 | Hall |
| 2015/0074246 A1* | 3/2015 | Premji .................... H04L 41/12 709/220 |
| 2015/0304209 A1 | 10/2015 | Choudhury et al. |
| 2016/0352766 A1 | 12/2016 | Flacher et al. |
| 2017/0150479 A1 | 5/2017 | Seo et al. |
| 2017/0308503 A1* | 10/2017 | Somohano ............. H04L 45/02 |
| 2017/0318053 A1 | 11/2017 | Singh et al. |
| 2020/0112487 A1 | 4/2020 | Inamdar et al. |

FOREIGN PATENT DOCUMENTS

| CA | 2462554 C  * | 9/2012 | ......... H04L 67/1095 |
| EP | 2750331 A1 * | 7/2014 | ........... G06F 15/177 |

OTHER PUBLICATIONS

PCT/US2023/011066, International Search Report and Written Opinion, dated Apr. 18, 2023, 11 pgs.

* cited by examiner

*Primary Examiner* — Hee Soo Kim
(74) *Attorney, Agent, or Firm* — Loza & Loza, LLP

(57) ABSTRACT

In an embodiment, a method of network deployment involves at a cloud server, receiving network device information of a network device when the network device is connected into a network, and at the cloud server, automatically performing network topology deviation detection for the network device based on a planned network design, the network device information, and port type information of a network port of the network device through which the network device is connected to the network.

9 Claims, 15 Drawing Sheets

METHODS AND SYSTEMS FOR AUTOMATIC NETWORK TOPOLOGY DEVIATION DETECTION

BACKGROUND

Network deployment, for example, enterprise network deployment, at a customer site typically involves a manual and lengthy process, which can take several weeks to months. For example, network deployment typically involves multiple time consuming and error-prone steps, such as gathering requirements, network design, network implementation, network operation, and network optimization, which are manually performed by network experts (e.g., network administrators). Network implementation usually includes physically racking and stacking of network devices and connecting the network devices according to a planned network topology by an installer. However, an installer performing network deployment can make intentional or unintentional deviations (e.g., changes in network topology, for example, by changing a network connection between network devices, adding an unplanned network device, or removing a planned network device) during the network deployment process, which can cause undesired network conditions (e.g., topology mismatch). In addition, getting a network expert (e.g., a network administrator) on-site may require additional time, which can prolong the network deployment process.

SUMMARY

Embodiments of a device and method are disclosed. In an embodiment, a method of network deployment involves at a cloud server, receiving network device information of a network device when the network device is connected into a network, and at the cloud server, automatically performing network topology deviation detection for the network device based on a planned network design, the network device information, and port type information of a network port of the network device through which the network device is connected to the network. Other embodiments are also disclosed.

In an embodiment, the port type information of the network port specifies whether the network port is an uplink network port, a downlink network port, or a ring network port for connecting the network device to a second network device that is located in a same network ring within the network as the network device.

In an embodiment, the network device includes uplink network ports for connecting the network device to uplink network devices of the network, downlink network ports for connecting the network device to downlink network devices of the network, and ring network ports for connecting the network device to network devices that are located in a same network ring within the network as the network device.

In an embodiment, at the cloud server, automatically performing network topology deviation detection for the network device based on the planned network design, the network device information, and the port type information of the network port of the network device through which the network device is connected to the network includes at the cloud server, determining planned port type information based on the planned network design and the network device information.

In an embodiment, at the cloud server, automatically performing network topology deviation detection for the network device based on the planned network design, the network device information, and the port type information of the network port of the network device through which the network device is connected to the network includes at the cloud server, reporting a network topology deviation associated with the network device to an operator when the port type information of the network port does not match the planned port type information.

In an embodiment, when the port type information of the network port specifies that the network port is an uplink network port, the planned port type information specifies that the network device is connected to the network through a downlink network port.

In an embodiment, when the port type information of the network port specifies that the network port is an uplink network port, the planned port type information specifies the network device to be connected to the network through a ring network port for connecting the network device to a second network device that is located in a same network ring within the network as the network device.

In an embodiment, when the port type information of the network port specifies that the network port is a downlink network port, the planned port type information specifies the network device to be connected to the network through an uplink network port.

In an embodiment, when the port type information of the network port specifies that the network port is a downlink network port, the planned port type information specifies the network device to be connected to the network through a ring network port for connecting the network device to a second network device that is located in a same network ring within the network as the network device.

In an embodiment, when the port type information of the network port specifies that the network port is a ring network port for connecting the network device to a second network device that is located in a same network ring within the network as the network device, the planned port type information specifies the network device to be connected to the network through an uplink network port.

In an embodiment, when the port type information of the network port specifies that the network port is a ring network port for connecting the network device to a second network device that is located in a same network ring within the network as the network device, the planned port type information specifies the network device to be connected to the network through a downlink network port.

In an embodiment, the method further includes from the cloud server, reporting a network topology deviation associated with the network device to an operator when the network topology deviation associated with the network device is detected at the cloud server.

In an embodiment, at the cloud server, automatically performing network topology deviation detection for the network device based on the planned network design, the network device information, and the port type information of the network port of the network device through which the network device is connected to the network includes at the cloud server, automatically performing network topology deviation detection for the network device based on the planned network design, the network device information, and the port type information of the network port of the network device through which the network device is connected to the network prior to or when a second device is connected to the network.

In an embodiment, a method of network deployment involves at an installer device, receiving an installation job for deploying a network at a customer site, at the installer device, scanning a code of a network device at the customer site to obtain network device information of the network device, from the installer device, sending the network device information of the network device to a cloud server, and at the installer device, receiving connectivity information of the network device that is determined based on the network device information from the cloud server, wherein the connectivity information of the network device specifies port type information of a network port of the network device through which the network device is to be connected to the network.

In an embodiment, the method further includes at the installer device, receiving a report of a network topology deviation associated with the network device from the cloud server after the network device is connected to the network, and at the installer device, determining whether an installer operating the installer device intentionally makes the network topology deviation associated with the network device.

In an embodiment, the method further includes addressing the network topology deviation associated with the network device when the installer operating the installer device does not intentionally make the network topology deviation associated with the network device by changing network connectivity of the network device based on a planned network design at the customer site.

In an embodiment, the port type information of the network port specifies whether the network port is an uplink network port, a downlink network port, or a ring network port for connecting the network device to a second network device that is located in a same network ring within the network as the network device.

In an embodiment, the network device includes uplink network ports for connecting the network device to uplink network devices of the network, downlink network ports for connecting the network device to downlink network devices of the network, and ring network ports for connecting the network device to network devices that are located in a same network ring within the network as the network device.

In an embodiment, a method of network deployment involves receiving an installation job for deploying a network at a customer site at a mobile application of an installer device, scanning a two-dimensional (2D) code of a network device at a customer site using the mobile application to obtain network device information, sending the network device information and location information of the network device at the customer site from the mobile application to a cloud server, and at the mobile application, receiving connectivity information of the network device that is determined based on the network device information from the cloud server, wherein the connectivity information of the network device specifies port type information of a network port of the network device through which the network device is to be connected to the network.

In an embodiment, the method further includes at the mobile application, receiving a report of a network topology deviation associated with the network device from the cloud server after the network device is connected to the network.

Other aspects in accordance with the invention will become apparent from the following detailed description, taken in conjunction with the accompanying drawings, illustrated by way of example of the principles of the invention.

BRIEF DESCRIPTION OF THE DRAWINGS

FIG. 5 depicts a distribution switch (DS) and a corresponding access switch (AS), which are embodiments of the network device depicted in FIG. 4.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

Figure 1:
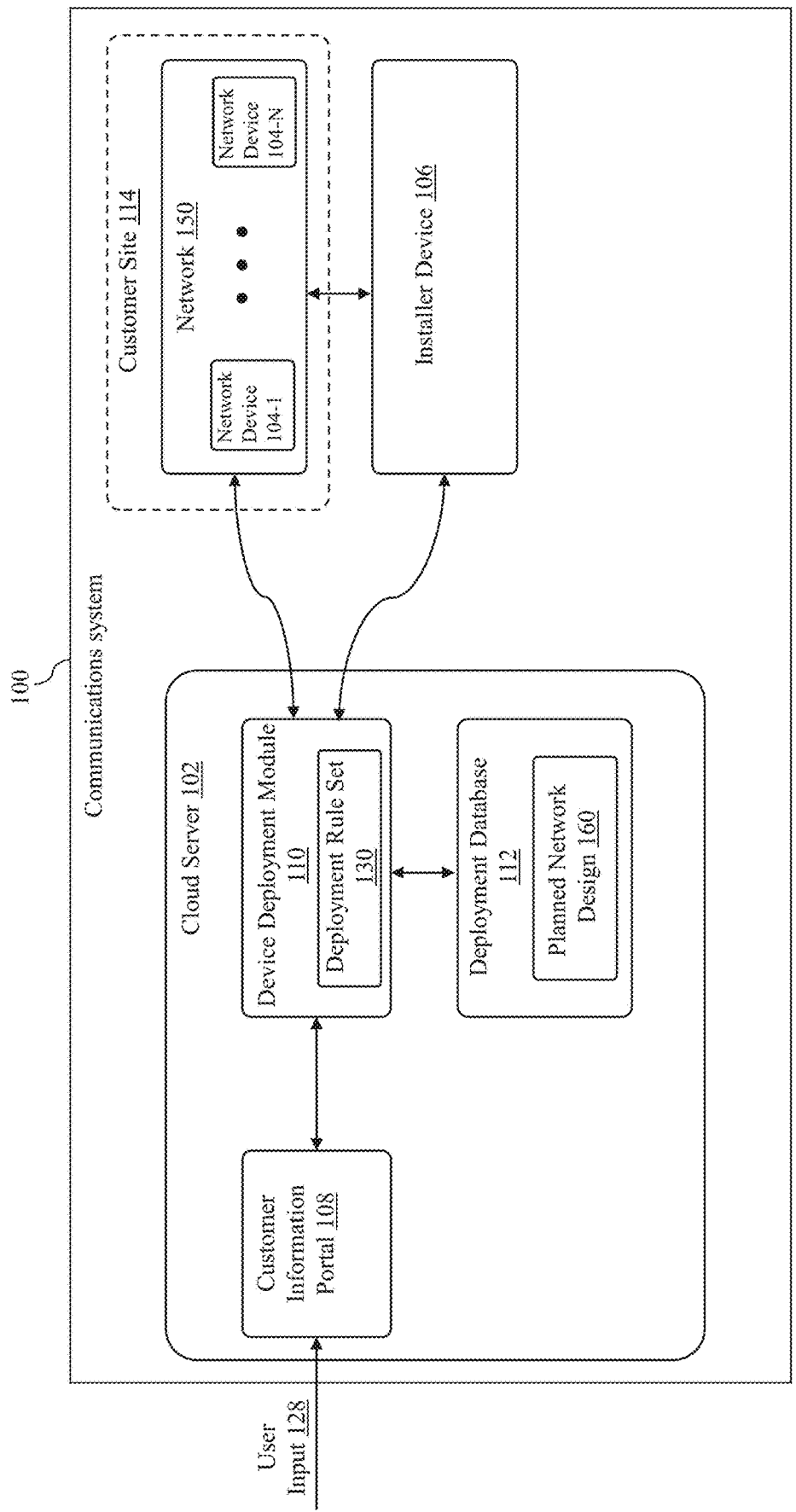
FIG. 1 depicts a communications system in accordance to an embodiment of the invention.

FIG. 1 depicts a communications system 100 in accordance to an embodiment of the invention. In the embodiment depicted in FIG. 1, the communications system includes a cloud server 102, at least one deployed network 150 within a customer site 114, and an installer device 106. The cloud server, the deployed network, and/or the installer device may be implemented in hardware (e.g., circuits), software, firmware, or a combination thereof. Although the illustrated communications system 100 is shown with certain components and described with certain functionality herein, other embodiments of the communications system may include fewer or more components to implement the same, less, or more functionality. For example, in some embodiments, the communications system includes more than one cloud server, more than one deployed network, more than one customer site, and/or more than one installer device. In another example, although the cloud server, the deployed network, and the installer device are shown in FIG. 1 as being connected in certain topology, the network topology of the communications system 100 is not limited to the topology shown in FIG. 1. In another example, the communications system 100 includes a survey device that is used by a technician to facilitate network design for the customer site 114.

The cloud server 102 can be used to provide at least one service to a customer site (e.g., to the deployed network 150 located at the customer site 114). The cloud server may be configured to facilitate or perform automatic network deployment deviation detection of network devices (e.g., the deployed network 150) at the customer site, for example, based on one or more predefined deployment rules. Because the cloud server can facilitate or perform automatic network deployment deviation detection of network devices at the customer site, network implementation efficiency and accuracy can be improved. The cloud server 102 may be implemented in hardware (e.g., circuits), software, firmware, or a combination thereof. In some embodiments, the cloud server is hosted or executed in a public cloud computing environment such as Amazon Web Services (AWS), and/or a private cloud computing environment such as an enterprise cloud server. In some embodiments, the cloud server is implemented on a server grade hardware platform, such as an x86 architecture platform. For example, the hardware platform of the cloud server may include conventional components of a computing device, such as one or more processors (e.g., central processing units (CPUs)), system memory, a network interface, storage system, and other Input/Output (I/O) devices such as, for example, a mouse and a keyboard (not shown). In some embodiments, the processor is configured to execute instructions such as, for example, executable instructions that may be used to perform one or more operations described herein and may be stored in the memory and the storage system. In some embodiments, the memory is volatile memory used for retrieving programs and processing data. The memory may include, for example, one or more random access memory (RAM) modules. In some embodiments, the network interface is configured to enable the cloud server to communicate with another device via a communication medium. The network interface may be one or more network adapters, also referred to as a Network Interface Card (NIC). In some embodiments, the cloud server includes local storage devices (e.g., one or more hard disks, flash memory modules, solid state disks and optical disks) and/or a storage interface that enables the host to communicate with one or more network data storage systems, which are used to store information, such as executable instructions, cryptographic keys, virtual disks, configurations, and other data.

In the embodiment depicted in FIG. 1, the cloud server 102 includes a device deployment module 110, a customer information portal 108 connected to the device deployment module 110, and a deployment database 112 configured to store deployment data. The device deployment module, the customer information portal, and/or the deployment database may be implemented in hardware (e.g., circuits), software, firmware, or a combination thereof. Although the illustrated cloud server is shown with certain components and described with certain functionality herein, other embodiments of the cloud server may include fewer or more components to implement the same, less, or more functionality. For example, in some embodiments, the cloud server includes more than one device deployment module, more than one customer information portal, and/or more than one deployment database. In another example, although the device deployment module, the customer information portal, and the deployment database are shown in FIG. 1 as being connected in a certain topology, the network topology of the cloud server is not limited to the topology shown in FIG. 1. In addition, although the customer information portal 108 is shown in FIG. 1 as being a component of the cloud server 102, in other embodiments, the customer information portal may be implemented outside of the cloud server.

In some embodiments, the device deployment module 110 is configured to facilitate or perform automatic network deployment deviation detection of network devices (e.g., the deployed network 150) at the customer site 114, for example, using a deployment rule set 130. The deployment rule set 130 may include one or more device deployment rules for deploying network devices at the customer site 114. In some embodiments, the device deployment module 110 is implemented using at least one processor (e.g., a microcontroller, a digital signal processor (DSP), and/or a CPU), and memory or other storage device. In some embodiments, the device deployment module 110 is configured to facilitate or perform automatic network deployment deviation detection of network devices (e.g., the deployed network 150) at the customer site 114 based on, for example, a planned network design 160 that is stored in the deployment database. The planned network design may include a list of network devices to be deployed at the customer site 114, a network topology of the network devices, and/or corresponding network configurations and/or location information (e.g., building information, floor information, and/or in-building location information) of the network devices. However, the actual configuration of the network topology may deviate from the planned network topology. For example, an installer performing network deployment can make intentional or unintentional network topology deviations (e.g., change a network connection between network devices (e.g., change network ports used to connect the network devices, add an unplanned network device, or remove a planned network device)). Because the device deployment module can facilitate automatic network deployment deviation detection of network devices at the customer site, network implementation efficiency and accuracy can be improved. In addition, because the device deployment module can facilitate automatic network deployment deviation detection of network devices at the customer site, a network implementation operator (e.g., an operator of the installer device 106) does not need to be a network expert. Consequently, network deployment time can be shortened and the labor cost for network deployment can be reduced. In some embodiments, the device deployment module is configured to determine a planned network design for a network to be deployed at a customer site. In some embodiments, the device deployment module is configured to receive network device information of a network device when the network device is connected into a network and to automatically perform network topology deviation detection for the network device based on a planned network design, the network device information, and port type information of a network port of the network device through which the network device is connected to the network. In some embodiments, the port type information of the network port specifies whether the network port is an uplink network port, a downlink network port, or a ring network port for connecting the network device to a second network device that is located in a same network ring within the network as the network device. In some embodiments, the network device includes uplink network ports for connecting the network device to uplink network devices of the network, downlink network ports for connecting the network device to downlink network devices of the network, and ring network ports for connecting the network device to network devices that are located in a same network ring within the network as the network device. In some embodiments, the device deployment module is configured to determine planned port type information based on the planned network design and the network device information.

In some embodiments, the device deployment module 110 is configured to report a network topology deviation associated with the network device to an operator when the port type information of the network port does not match the planned port type information. For example, a network topology deviation may exist when the port type information of the network port indicates that the network port is an uplink network port but the planned port type information specifies that the network device should be connected to the network through a downlink network port. In another example, a network topology deviation may exist when the port type information of the network port indicates that the network port is an uplink network port but the planned port type information specifies that the network device should be connected to the network through a ring network port for connecting the network device to a second network device that is located in a same network ring within the network as the network device. In another example, a network topology deviation may exist when the port type information of the network port indicates that the network port is a downlink network port but the planned port type information specifies the network device should be connected to the network through an uplink network port. In another example, a network topology deviation may exist when the port type information of the network port indicates that the network port is a downlink network port but the planned port type information specifies the network device should be connected to the network through a ring network port for connecting the network device to a second network device that is located in a same network ring within the network as the network device. In another example, a network topology deviation may exist when the port type information of the network port indicates that the network port is a ring network port for connecting the network device to a second network device that is located in a same network ring within the network as the network device but the planned port type information specifies the network device should be connected to the network through an uplink network port. In another example, a network topology deviation may exist when the port type information of the network port indicates that the network port is a ring network port for connecting the network device to a second network device that is located in a same network ring within the network as the network device but the planned port type information specifies the network device should be connected to the network through a downlink network port. In some embodiments, the device deployment module is configured to identify network topology deviations by comparing the port type information of the network port with and planned port type information, which may be stored in the deployment database 112, and report such deviations to an operator when the network topology deviation associated with the network device is detected at the cloud server. In some embodiments, the device deployment module is configured to automatically perform network topology deviation detection for the network device based on the planned network design, the network device information, and the port type information of the network port of the network device through which the network device is connected to the network prior to or when a second device is connected to the network based on a predefined algorithm without human inputs or interactions. The device deployment module can report a network topology deviation to an operator and/or generate one or more reports for future evaluations.

In some embodiments, the deployment database 112 is configured to store deployment data for a network deployed and/or to be deployed at the customer site (e.g., a list of network devices deployed or to be deployed at the customer site). For example, the deployment database 112 is configured to store the planned network design 160, which may include a list of network devices to be deployed at the customer site 114, a network topology of network devices and corresponding network configurations and/or location information (e.g., building information, floor information, and/or in-building location information) of the network devices. In some embodiments, the deployment database is configured to store a list of network devices deployed or to be deployed at the customer site and detailed information related to the network devices, for example, device type information of the network devices, deployment topology information that defines how network devices are connected to each other, and/or device location information (e.g., building information, floor information, and in-building location information) of network devices deployed or to be deployed at the customer site.

In some embodiments, the customer information portal 108 is configured to receive user input 128. In some embodiments, the customer information portal is configured to include or generate a user interface that allows a customer to input information related to the customer site 114 (e.g., the floor plan of the customer site 114) and/or information associated with a service for the customer site 114, such as one or more specific requirements or restrictions.

In the communications system 100 depicted in FIG. 1, the customer site 114 may include one or more buildings, and each building may include one or more floors. Network devices that can be deployed at the customer site may include any type of suitable network devices. For example, network devices may be designated to be deployed to a specific building, a specific floor within a building, and/or a specific location on a floor of a building. A network device that can be deployed at the customer site may be fully or partially implemented as an Integrated Circuit (IC) device. In the embodiment depicted in FIG. 1, the network 150 includes one or more network devices 104-1, . . . , 104-N, where N is a positive integer. In some embodiments, at least one of the one or more network devices 104-1, . . . , 104-N is a wired and/or wireless communications device that includes at least one processor (e.g., a microcontroller, a DSP, and/or a CPU), at least one wired or wireless communications transceiver implemented in one or more logical circuits and/or one or more analog circuits, at least one wired or wireless communications interface and that supports at least one wired or wireless communications protocol, and/or at least one antenna. For example, at least one of the one or more network devices 104-1, . . . , 104-N is compatible with Institute of Electrical and Electronics Engineers (IEEE) 802.3 protocol and/or one or more wireless local area network (WLAN) communications protocols, such as IEEE 802.11 protocol, and/or a short-range communications protocol, such as Bluetooth. In some embodiments, at least one of the one or more network devices 104-1, . . . , 104-N is a wired communications device that is compatible with at least one wired local area network (LAN) communications protocol, such as a wired router (e.g., an Ethernet router), a wired switch, a wired hub, or a wired bridge device (e.g., an Ethernet bridge). In some embodiments, at least one of the one or more network devices 104-1, . . . , 104-N is a wireless access point (AP) that connects to a local area network (e.g., a LAN) and/or to a backbone network (e.g., the Internet) through a wired connection and that wirelessly connects to wireless stations (STAs), for example, through one or more WLAN communications protocols, such as an IEEE 802.11 protocol. In some embodiments, the network 150 includes at least one distribution switch (DS) or distribution layer switch that functions as a bridge between a core layer switch and an access layer switch, at least one head end (HE) or gateway, at least one access switch (AS) that can directly interact with a lower-level device (e.g., a wireless AP), at least one wireless AP, and/or at least one wireless sensor that wirelessly connects to a wireless AP. In some embodiments, at least one of the one or more network devices 104-1, . . . , 104-N is a wireless station (STA) that wirelessly connects to a wireless AP. For example, at least one of the one or more network devices 104-1, . . . , 104-N may be a laptop, a desktop personal computer (PC), a mobile phone, or other wireless device that supports at least one WLAN communications protocol (e.g., an IEEE 802.11 protocol)).

Figure 2:
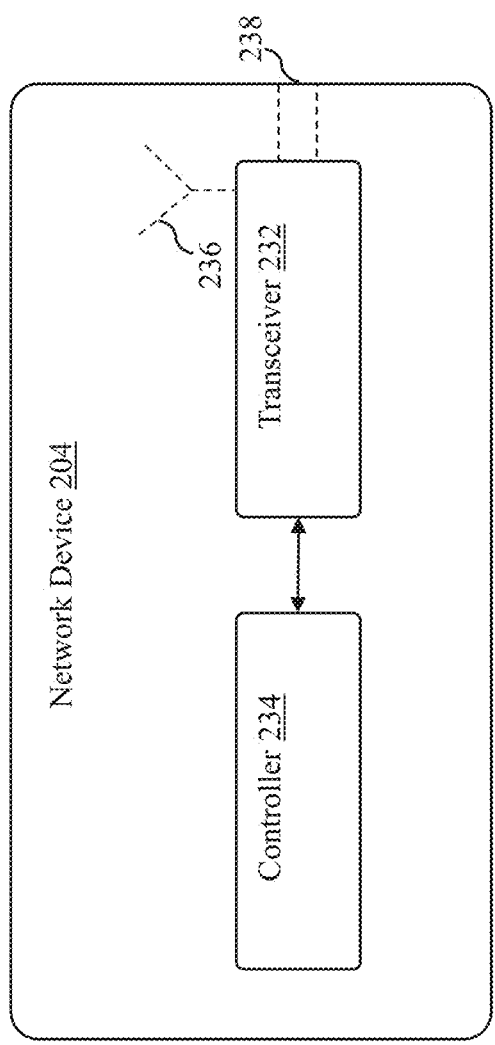
FIG. 2 depicts an embodiment of a network device of the communications system depicted in FIG. 1.

FIG. 2 depicts an embodiment of a network device 204 of the communications system 100 depicted in FIG. 1. The network device 204 may be an embodiment of a network device 104-1, . . . , or 104-N that is included in the deployed network 150 in FIG. 1. However, network devices 104-1, . . . , 104-N that can be included in the deployed network 150 depicted in FIG. 1 are not limited to the embodiment depicted in FIG. 2. The network device 204 may be any suitable type of network device. For example, the network device 204 may be a distribution switch (DS), a gateway, an access switch (AS), a wireless access point (AP), a STA, or a sensor. In the embodiment depicted in FIG. 2, a network device 204 includes at least one wireless and/or wired transceiver 232, at least one optional antenna 236 operably connected to the transceiver 232, at least one optional network port 238 operably connected to the transceiver 232, and a controller 234 operably connected to the transceiver 232. In some embodiments, the transceiver 232 includes a physical layer (PHY) device. The transceivers 232 may be any suitable type of transceiver. For example, the transceiver 232 may be a short-range communications transceiver (e.g., a Bluetooth or Bluetooth Low Energy (BLE) transceiver) or a WLAN transceiver (e.g., a transceiver compatible with an IEEE 802.11 protocol). In some embodiments, the network device 204 includes multiple transceivers, for example, a short-range communications transceiver (e.g., a Bluetooth or BLE transceiver) and a WLAN transceiver (e.g., a transceiver compatible with an IEEE 802.11 protocol). For example, the network device 204 includes a WLAN transceiver (e.g., a transceiver compatible with an IEEE 802.11 protocol) and a short-range communications transceiver (e.g., a Bluetooth or BLE transceiver). In some embodiments, the network device (e.g., a wireless AP) includes multiple antennas and multiple wireless transceivers that share the antennas. In some embodiments, the controller 234 is configured to control the transceiver 232 to process packets received through the antenna 236 and/or the network port 238 and/or to generate outgoing packets to be transmitted through the antenna 236 and/or the network port 238. In some embodiments, the controller 234 is configured to obtain and/or store network information relevant to the network device 204. For example, the controller 234 may be configured to obtain and/or store network information (e.g., routing information such as a routing table) relevant to the network device 204. The antenna 236 may be any suitable type of antenna. For example, the antenna 236 may be an induction type antenna such as a loop antenna or any other suitable type of induction type antenna. However, the antenna 236 is not limited to an induction type antenna. The network port 238 may be any suitable type of port. For example, the network port 238 may be a local area network (LAN) network port such as an Ethernet port. However, the network port 238 is not limited to LAN network ports. Although the illustrated network device 204 is shown with certain components and described with certain functionality herein, other embodiments of the network device 204 may include fewer or more components to implement the same, less, or more functionality. For example, in some embodiments, the network device 204 includes the at least one antenna 236 but no network port. In another example, in some embodiments, the network device 204 includes the at least one network port 238 bur no antenna.

Figure 3:
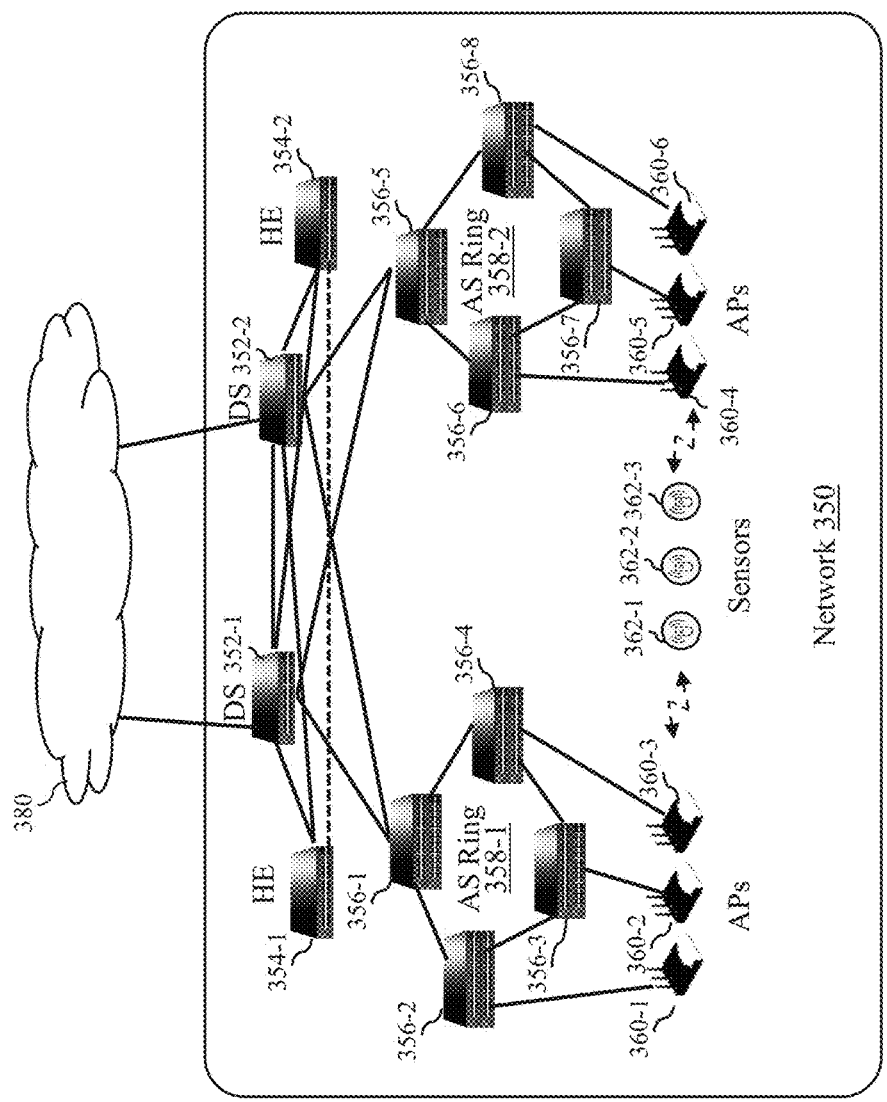
FIG. 3 depicts a network that can be included in the communications system depicted in FIG. 1.

FIG. 3 depicts a network 350 that can be included in the communications system 100 depicted in FIG. 1. The network 350 depicted in FIG. 3 is an embodiment of the network 150 depicted in FIG. 1. However, the network 150 depicted in FIG. 1 is not limited to the embodiment depicted in FIG. 3. In the embodiment depicted in FIG. 3, the network 350 includes a pair of distribution switches (DSs) or distribution layer switches 352-1, 352-2 that are aggregation switches functioning as a bridge between core layer switches and access layer switches, a pair of head ends (HEs) or gateways 354-1, 354-2, a number of access switches (ASs) 356-1, 356-2, 356-3, 356-4, 356-5, 356-6, 356-7, 356-8 connected in rings 358-1, 358-2 that directly interact with lower level devices (e.g., wireless APs), a number of wireless APs 360-1, 360-2, 360-3, 360-4, 360-5, 360-6 connected to the ASs, and a number of wireless sensors 362-1, 362-2, 362-3 that wirelessly connect to the wireless APs. The DSs 352-1, 352-2 are connected to a network 380 (e.g., the Internet), which is connected to a network management module (e.g., the device deployment module 110 of the cloud server 102 depicted in FIG. 1). In some embodiments, the network 350 constitutes a network service block (NSB), which is a basic building block for providing connectivity as a service and is a replicable block that can be scaled (e.g., expanded) to meet any deployment. Although the network 350 is shown with certain components and described with certain functionality herein, other embodiments of the network 350 may include fewer or more components to implement the same, less, or more functionality. For example, in some embodiments, the network 350 includes only one DS, more than two DSs, no HE, only one HE, more than two HEs, less than eight ASs, more than eight ASs, less than six wireless APs, more than six wireless APs, less than three wireless sensors, more than three wireless sensors, and/or one or more wireless/wired STAs. In another example, the network 350 includes one or more wired and/or wireless devices, for example, laptops, desktop personal computers (PCs), mobile phones, and/or cameras. In another example, although the network 350 shown in FIG. 3 as being connected in certain topology, the network topology of the network 350 is not limited to the topology shown in FIG. 3. In some embodiments, the number of HEs and DSs is constant in the network 350 while the number of the wireless APs, the ASs and the sensor(s) in the network 350 varies.

Turning back to the communications system 100 depicted in FIG. 1, the installer device 106 may be any type of suitable network device that is used by an operator (e.g., a layperson, such as, a contractor without advanced understanding of networking technology, a worker on-site, or an end-user such as an employee) at the customer site to facilitate the deployment of network devices (e.g., the network 150) at the customer site 114. In some embodiments, the installer device may be fully or partially implemented as an IC device. In some embodiments, the installer device is a wireless communications device that includes at least one processor (e.g., a microcontroller, a DSP, and/or a CPU), at least one wireless communications transceiver, at least one wireless communications interface, and/or at least one antenna and that supports at least one wireless communications protocol. In some embodiments, the installer device is a handheld wireless device, such as a cellular phone or a mobile phone (e.g., a smart phone), a pad computer, a Personal Digital Assistant (PDA) etc. that supports one or more radio frequency (RF) communications protocols, including without limitation, Bluetooth, The Global System for Mobile Communications (GSM), Universal Mobile Telecommunications System (UMTS), Code Division Multiple Access (CDMA), Worldwide Interoperability for Microwave Access (WiMax) and communications protocols as defined by the 3rd Generation Partnership Project (3GPP) or the 3rd Generation Partnership Project 2 (3GPP2), 4G Long Term Evolution (LTE), the fifth generation technology standard for broadband cellular network (5G), and IEEE 802.16 standards bodies and/or one or more wireless local area network (WLAN) communications protocols, such as an IEEE 802.11 protocol. For example, the installer device 106 is a wireless communications device, such as a handheld wireless device (e.g., a cellular phone or a mobile phone) that supports multiple communications protocols, which may include at least one cellular communications protocol and at least short-range communications protocol (e.g., Bluetooth). In some embodiments, automatic network deployment deviation detection software or App is installed on the installer device 106 (e.g., a mobile phone or tablet). In some embodiments, the installer device is configured to, in a mobile application, present an interface querying an installer operating the installer device whether or not the installer intentionally makes a network deployment deviation associated with the network device.

Figure 4:
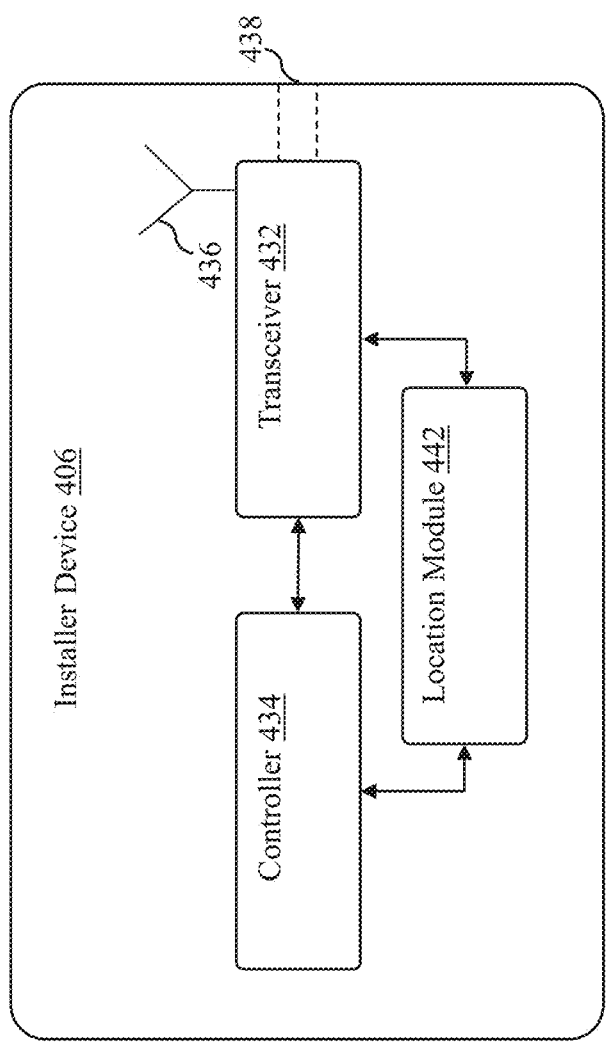
FIG. 4 depicts an embodiment of an installer device of the communications system depicted in FIG. 1.

FIG. 4 depicts an embodiment of the installer device 106 of the communications system 100 depicted in FIG. 1. The installer device 406 depicted in FIG. 4 is an embodiment of the installer device 106 depicted in FIG. 1. However, the installer device 106 depicted in FIG. 1 are not limited to the embodiment depicted in FIG. 4. In the embodiment depicted in FIG. 4, the installer device 406 includes a wireless and/or wired transceiver 432, a controller 434 (e.g., a microcontroller, a DSP, and/or a CPU) operably connected to the transceiver 432, at least one antenna 436 operably connected to the transceiver 432, at least one optional network port 438 operably connected to the transceiver 432, and a location module 442. In some embodiments, the installer device 406 is a handheld wireless device, such as a cellular phone or a mobile phone (e.g., a smart phone), a pad computer, a Personal Digital Assistant (PDA) etc. that supports one or more RF communications protocols. In some embodiments, the transceiver 432 includes a physical layer (PHY) device. The transceiver 432 may be any suitable type of transceiver. For example, the transceiver 432 may be a short-range communications transceiver (e.g., a Bluetooth) or a LAN transceiver (e.g., a transceiver compatible with an IEEE 802.11 protocol). In some embodiments, the installer device 406 includes multiple transceivers, for example, a short-range communications transceiver (e.g., a Bluetooth) and a LAN transceiver (e.g., a transceiver compatible with an IEEE 802.11 protocol). The controller 434 may be configured to control the transceiver 432 to process packets received through the antenna 436 and/or the network port 438 and/or to generate outgoing packets to be transmitted through the antenna 436 and/or the network port 438. The antenna 436, which may be optional in some implementations, may be any suitable type of antenna. For example, the antenna 436 may be an induction type antenna such as a loop antenna or any other suitable type of induction type antenna. However, the antenna 436 is not limited to an induction type antenna. The network port 438 may be any suitable type of port. For example, the network port 438 may be a local area network (LAN) network port such as an Ethernet port. However, the network port 438 is not limited to LAN network ports. The location module 442 is configured to determine or obtain location information of the installer device or a device that is associated with (e.g., connected with or in the vicinity of) the installer device. Examples of location information that can be determined or obtained by the location module 442 include without being limited to, address information in a map/navigation system, coordinate information in a map/navigation system, latitude and longitude information in a map/navigation system, and relative positional information in a map/navigation system. In some embodiments, the location information that can be determined or obtained by the location module 442 includes one or more X, Y coordinates and/or Global Positioning System (GPS) coordinates or other global or satellite location system coordinates. In some embodiments, the location module 442 is a GPS or other global or satellite location system module that includes a GPS receiver or other global or satellite. In some embodiments, the location module 442 uses location techniques such as triangulation or in-door beacon based location technique to determine or obtain location information of the installer device or a device that is associated with (e.g., connected with or in the vicinity of) the installer device. Although the installer device 406 is shown with certain components and described with certain functionality herein, other embodiments of the installer device 406 may include fewer or more components to implement the same, less, or more functionality. For example, in some embodiments, the installer device 406 includes a different number of network port(s) and antenna(s). In some embodiments, the installer device (e.g., a mobile application installed in the installer device) is configured to receive an installation job for deploying a network at a customer site, to scan a code (e.g., a two-dimensional (2D) code) of a network device at the customer site to obtain network device information of the network device, to send the network device information of the network device to a cloud server, and to receive connectivity information of the network device that is determined based on the network device information from the cloud server, where the connectivity information of the network device specifies port type information of a network port of the network device through which the network device is to be connected to the network. In some embodiments, the installer device is configured to receive a report of a network topology deviation associated with the network device from the cloud server after the network device is connected to the network and to determine whether an installer operating the installer device intentionally makes the network topology deviation associated with the network device. In some embodiments, the port type information of the network port specifies whether the network port is an uplink network port, a downlink network port, or a ring network port for connecting the network device to a second network device that is located in a same network ring within the network as the network device.

Figure 5:
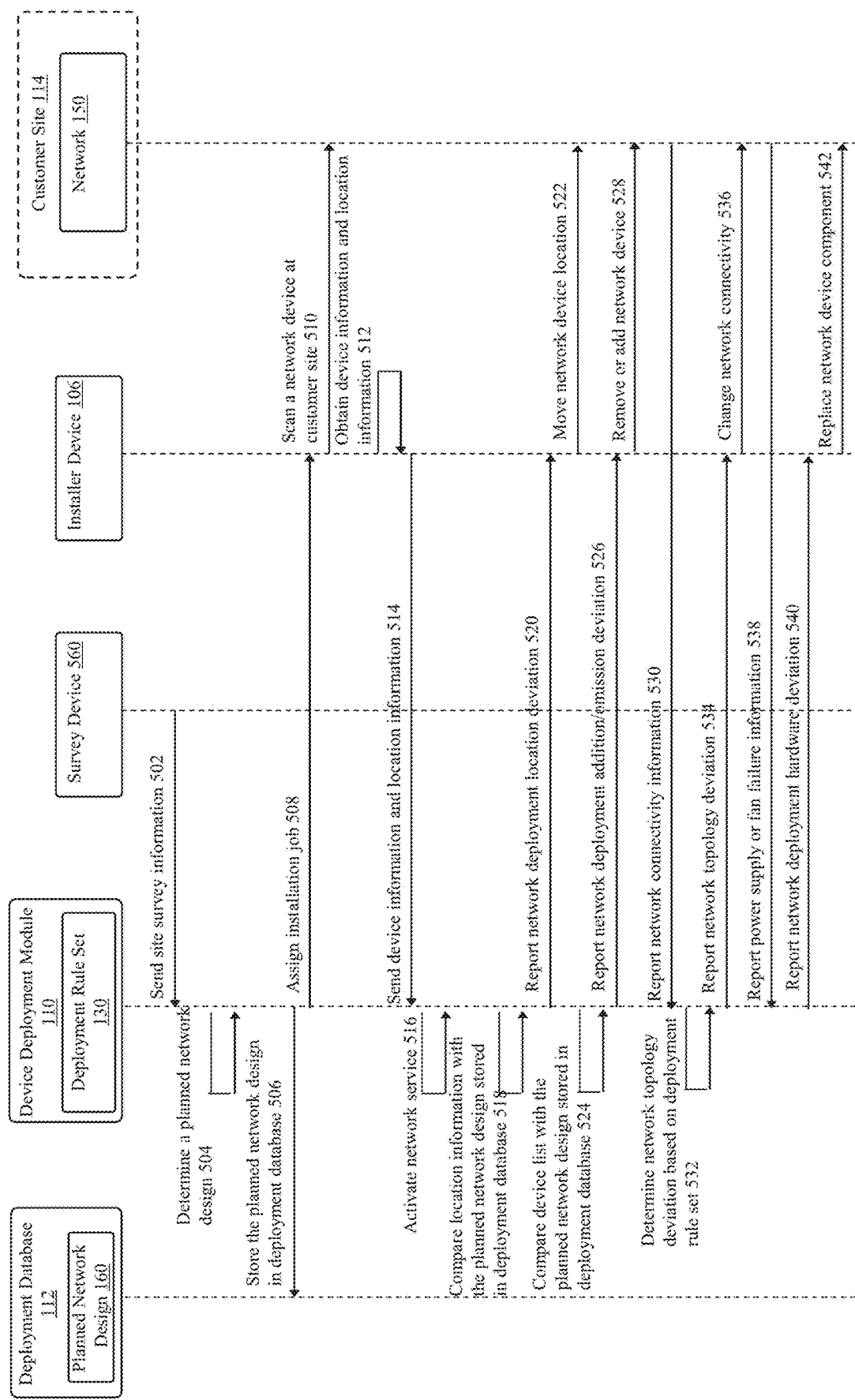
FIG. 5 shows a swim-lane diagram illustrating an example procedure for automatic network deployment deviation detection in the communications system depicted in FIG. 1.

FIG. 5 shows a swim-lane diagram illustrating an example procedure for automatic network deployment deviation detection in the communications system 100 depicted in FIG. 1. In this automatic network deployment deviation detection procedure, a deviation in a network device deployment is automatically detected by the device deployment module 110 of the cloud server 102, for example, based on the planned network design 160 stored in the deployment database 112 and/or the deployment rule set 130, which includes one or more network deployment rules. Although operations in the example procedure in FIG. 5 are described in a particular order, in some embodiments, the order of the operations in the example procedure may be altered so that certain operations may be performed in an inverse order or so that certain operations may be performed, at least in part, concurrently with other operations.

In an optional operation 502, a survey device 560 transmits survey information of the customer site 114 to the device deployment module 110 of the cloud server 102. The site survey information may include wired connectivity information for the customer site, such as the number of wired port(s), type of wired port(s) (e.g., power over ethernet (PoE) vs. non-PoE), and/or the location(s) of port(s) available at the customer site and/or to be newly installed at the customer site, and/or wireless connectivity information for the customer site, such as the number of wireless APs available at the customer site and/or to be newly installed at the customer site to deliver the coverage and capacity required for the customer site. In some embodiments, the survey information of the customer site 114 includes the location and the number of wired port(s) needed for the customer site on a per floor basis, whether or not there is enough power outlet(s) and rack space(s) available to deploy network device(s), an optimal number of wireless AP(s) to be installed and location(s) on a per floor basis to meet the coverage and capacity requirements of the customer site, and/or any co-channel interference between wireless APs.

In operation 504, the device deployment module 110 of the cloud server 102 determines network information (e.g., the planned network design 160) for a network to be deployed at the customer site 114, for example, based on the survey information received from the survey device 560. In some embodiments, the network design may also include a Bill of Materials (BoM) and a connectivity map for the network to be deployed at the customer site. Compared to manually determining BoM data (e.g., required network elements) for a network to be deployed at a customer site, the device deployment module 110 of the cloud server 102 can automatically determine a BoM for a network at a customer site (e.g., the customer site 114). Consequently, network design efficiency and accuracy can be improved. In addition, compared to designing network topology for a network at a customer site after the network is installed at the customer site, the device deployment module 110 can automatically generate a topology map for a network at a customer site prior to deploying the network at the customer site. Consequently, time required for network design for a customer site can be shortened or reduced. The list of network elements to be newly installed at the customer site 114 may be generated using a standardized network block that includes a specific combination of network devices. In an embodiment, a customer network may be designed as a set of standardized network blocks, which are also referred to as network service blocks (NSBs). In some embodiments, once the BoM for a network to be deployed at the customer site is generated, the device deployment module is configured to automatically generate a connectivity map that defines how network elements in the BoM are connected to each other. In some embodiments, the automatic generation of a connectivity map is enabled by building rules using a reference topology that defines how network elements connect to each other and network ports to be used by the network elements (i.e., allowed ports) for the connectivity. For example, a specific device (e.g., a network switch) may include a first set of ports (e.g., 1-24) that are of a first type and are used to connect the specific device with a first sets of network devices (e.g., APs and wired routers) and a second set of ports (e.g., 25-28) that are of a second type and are used to connect the specific device with a second sets of network devices (e.g., access switches). However, the number and types of ports that a network device can have are not limited to the examples described.

After the device deployment module 110 of the cloud server 102 determines the planned network design 160 for a network to be deployed at the customer site 114, in operation 506, the device deployment module stores the planned network design 160 in the deployment database 112, which is also referred to as a planned deployment (PD) database.

After the device deployment module 110 of the cloud server 102 determines the planned network design 160 for a network to be deployed at the customer site 114, the network 150 is deployed (e.g., network devices including switches, routers, hubs, and/or wireless APs are installed) at the customer site 114 based on the planned network design 160 (e.g., the BoM and the connectivity map). In operation 508, the device deployment module 110 assigns an installation job to an installer or technician that uses the installer device 106. In some embodiments, the installer/technician uses a mobile application (app) that is installed in the installer device and is assigned the installation job via the mobile app. For example, the installer device is a handheld wireless device, such as a cellular phone or a mobile phone (e.g., a smart phone), a pad computer, a PDA etc., and the mobile app is a mobile application from an application store (e.g., Android Market, Apple App Store, Amazon Appstore, carrier applications stores, etc.). In an embodiment, an installation job that is assigned to the installer or technician includes detailed information related to a customer and network device deployment information. The detailed information related to a customer may include the name of the customer, site information of the customer, floor information of the customer, and/or the address of the customer. The network device deployment information may include a list of device(s) to be installed and device type(s), floor plan(s) and locations of a network device is to be installed in a floor plan, and/or a deployment topology that defines how network devices are connected to each other. One or more network devices to be installed are sent to a customer site. In some embodiments, there is no pre-population of device specific information (e.g., device serial number and/or media access control (MAC) address) of a network device to be installed in a central database when the network device to be installed is sent to a customer site. For example, the device deployment module 110 has no knowledge of specific information (e.g., device serial number and/or media access control (MAC) address) of a network device to be installed at a customer site before the network device is installed at the customer site.

In operation 510, an installer or a technician uses the installer device 106 to scan the one or more network devices 104-1, . . . , 104-N of the network 150 at the customer site 114. In some embodiments, the installer or technician uses information in a mobile app installed in the installer device and scans each of the network devices 104-1, . . . , 104-N at a customer location indicated by the mobile app. The installer or technician may use the installer device (e.g., a mobile app installed in the installer device) to scan a code (e.g., a Quick Response (QR) code) of each of the network devices 104-1, . . . , 104-N. The code of a network device may be on a surface of the network device and/or on the packaging (e.g., the box or the wrapper) of the network device. For example, the code of a network device may be stamped on, printed on, or attached to a surface of the network device and/or on the packaging of the network device. The code of a network device may be any suitable code that can be read (e.g., optically read) by the installer device 106, which may be a handheld device, such as a mobile phone or a tablet. For example, the code of a network device may be a QR code or a two-dimensional (2D) barcode on the network device (e.g., printed on a housing of the device itself or printed on packaging of the network device). The code (e.g., the QR code) on a network device may represent or contain the serial number of the network device, a device type of the network device, and/or MAC address information of the network device. In another example, the code of a network device is a radio-frequency identification (RFID) tag or a Near-Field-Communication (NFC) tag that can be wirelessly read by the installer device 106. In operation 512, the installer device 106 obtains information regarding the one or more network devices 104-1, . . . , 104-N of the network 150 (e.g., device information and location information of the one or more network devices 104-1, . . . , 104-N of the network 150) based on scanning of the network devices. For example, the installer device 106 obtains the serial number of each network device, a device type of each network device, and/or MAC address information of each network device based on a scanned QR code of each network device and the location of each network device during the scan of the QR code of each network device. After scanning a network device, the installer connects the network device to one or more other network devices in accordance with a predefined network design of the network 150, e.g., the planned network design 160.

In operation 514, the installer device 106 transmits the information regarding each of the network devices 104-1, . . . , 104-N that is obtained from a scan of the network device and/or location information of the network device to the device deployment module 110 of the cloud server 102. Examples of location information of a network device include without being limited to, address information in a map/navigation system, coordinate information in a map/navigation system, latitude and longitude information in a map/navigation system, and relative positional information in a map/navigation system. In some embodiments, the location information of a network device includes one or more GPS coordinates of the network device. In some embodiments, the installer device transmits the MAC address and the serial number of the network device and the customer information from a mobile app installed in the installer device that contains location information of the network device to the device deployment module.

In operation 516, the device deployment module 110 of the cloud server 102 activates each of the network devices 104-1, . . . , 104-N of the network 150, for example, based on the device information and the location information received from the installer device. In some embodiments, the device deployment module associates each network device with a database entry of the planned network design 160 in the deployment database 112 of the cloud server without manual input. In some embodiments, the planned network design 160 contains a list of network devices to be deployed at a customer site and detailed information related to the network devices, for example, device name information of the network devices, device type information of the network devices and deployment topology information that defines how network devices are connected to each other. After a network device is associated with a corresponding database entry in the deployment database, the network device is activated. In some embodiments, the device deployment module performs location based service activation of the network devices 104-1, . . . , 104-N.

After the activation of a network device 104-1, . . . , or 104-N of the network 150, the cloud server 102 (e.g., the device deployment module 110) can detect one or more network deployment deviations in the deployment of the network 150 based on the planned network design 160 and/or the deployment rule set 130. The cloud server 102 (e.g., the device deployment module 110) can, for example, detect location, topology, addition/omission, and/or hardware network deployment deviations in the deployment of the network 150 and notify an installer in real-time such that remedy actions can be taken by the installer to address or resolve the network deployment deviations. For example, an installer may be assigned an installation job using a mobile app at the installer device 106 of the installer. The mobile app at the installer device 106 can guide the installer to bring up every network device into an operational state. As each network device is installed, the status of the network device and any deviations to the planned deployment may be notified to the installer in real-time so remedial action can be taken by the installer. The cloud server 102 (e.g., the device deployment module 110) can determine in real time if the topology and inventory match a planned topology and inventory to provide feedback to an installer. The cloud server 102 (e.g., the device deployment module 110) can periodically present the deviations regarding inventory and topology to an installer such that the installer can fix the deviation while the installer brings up a network, instead of waiting for the entire network to be brought up.

In operation 518, the cloud server 102 (e.g., the device deployment module) compares a deployed location of a network device 104-1, . . . , or 104-N with a planned or suggested location of the network device in the planned network design 160 stored in deployment database 112 to detect a network deployment location deviation. For example, the cloud server 102 (e.g., the device deployment module) detects a network deployment location deviation if the deployed location of a network device 104-1, . . . , or 104-N is different from a planned or suggested location of the network device in the planned network design 160 stored in deployment database 112. If no network deployment location deviation is detected, the cloud server (e.g., the device deployment module) takes no action to address network deployment location deviation. If a network deployment location deviation is detected, in operation 520, the cloud server (e.g., the device deployment module) reports the network deployment location deviation to the installer device, e.g., to a mobile application in the installer device. If an installer operating the installer device intentionally makes the network deployment location deviation, the installer may take no action to address network deployment location deviation. Otherwise, in operation 522, an installer operating the installer device addresses the network deployment location deviation by moving a corresponding network device from its deployed location to the planned or suggested location of the corresponding network device in the planned network design 160. For example, a specific network device in the planned network design 160 may have a suggested location, for example, coordinates $(X_1, Y_1)$ in the floor plan. It is possible that due to various reasons, an installer places the specific network device at a different location, for example, coordinates $(X_2, Y_2)$ in the floor plan. When the specific network device is activated, for example, by scanning a QR code on the specific network device using the installer device 106, a mobile app in the installer device 106 sends the new coordinates of the specific network device to the cloud server, which detects a network deployment location deviation and reports the network deployment location deviation to an installer using the installer device 106. If the installer intentionally deviates from the planned network design 160, the installer may notify the cloud server or an operator (e.g., an administrator) at the cloud server via a mobile app in the installer device 106 and the cloud server or an operator (e.g., an administrator) at the cloud server may accept this location deviation. However, if the network deployment location deviation is unintentional, the installer can fix the deviation promptly by, for example, moving the specific network device from the deployed location (e.g., coordinates $(X_2,Y_2)$ in the floor plan) to the suggested location in the planned network design 160 (e.g., coordinates $(X_1, Y_1)$ in the floor plan).

In operation 524, the cloud server 102 (e.g., the device deployment module) compares a list of deployed devices in the network 150 at the customer site 114 with a planned list of network devices to be deployed in the planned network design 160 stored in deployment database 112 to detect a network deployment addition/omission deviation. For example, any addition or deletion of devices from the planned network design is reported as a network deployment addition/omission deviation to a mobile app at the installer device to alert an installer of such deviation. In some embodiments, the cloud server 102 (e.g., the device deployment module) detects a network deployment addition deviation if more than planned number of network devices are deployed in the network at the customer site 114 and/or detects a network deployment omission deviation if less than planned number of network devices are deployed in the network at the customer site 114. If no network deployment addition/omission deviation is detected, the cloud server (e.g., the device deployment module) takes no action to address network deployment addition/omission deviation. If a network deployment addition/omission deviation is detected, in operation 526, the cloud server (e.g., the device deployment module) reports the network deployment addition/omission deviation to the installer device, e.g., to a mobile application in the installer device. In some embodiments, if an installer operating the installer device intentionally makes the network deployment addition/omission deviation, the installer may take no action to address the network deployment addition/omission deviation. Otherwise, in operation 528, an installer operating the installer device addresses the network deployment addition/omission deviation by adding a network device that is included in the planned network design 160 but not included in the list of deployed network device or by removing a network device that is not included in the planned network design 160 but is included in the list of deployed network device.

In operation 530, the network 150 (e.g., a network device 104-1, . . . , or 104-N) reports network connectivity information to the cloud server 102 (e.g., the device deployment module 110). In operation 532, the cloud server 102 (e.g., the device deployment module) determines a network topology deviation based on the deployment rule set 130 and the network connectivity information to detect a network topology deviation. In some embodiments, the cloud server 102 (e.g., the device deployment module 110) does not require a network port of a specific port number to be used for a network connection. As long as an uplink port is used for the uplink connectivity, a downlink port is used for the downlink connectivity, a ring port is used for the ring connectivity, the cloud server 102 (e.g., the device deployment module 110) does not generate a network topology deviation and does not alert an installer to correct a corresponding port connection. When the cloud server 102 (e.g., the device deployment module) detects a network topology deviation, the cloud server 102 (e.g., the device deployment module) reports the network topology deviation to the installer device 106, e.g., to a mobile application in the installer device in operation 534. If no network topology deviation is detected, the cloud server (e.g., the device deployment module) takes no action to address such deviation. In some embodiments, if an installer operating the installer device intentionally makes the network topology deviation, the installer may take no action to address the network topology deviation. Otherwise, in operation 536, the installer operating the installer device addresses the network topology deviation by changing network connectivity, for example, by changing a network port or network ports to which a network cable is connected to.

In operation 538, the network 150 (e.g., a network device 104-1, ..., or 104-N) reports power supply or fan failure information to the cloud server 102 (e.g., the device deployment module 110). In operation 540, the cloud server 102 (e.g., the device deployment module) report a network deployment hardware deviation to the installer device 106, e.g., to a mobile application in the installer device in operation 534. In operation 542, the installer operating the installer device addresses the network deployment hardware deviation by repairing or replacing an affected device.

Figure 6:
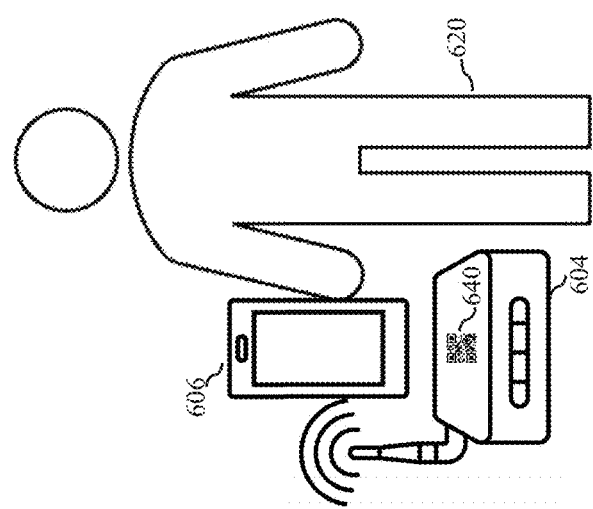
FIG. 6 depicts an installer having an installer device scanning a Quick Response (QR) code of a wireless device.

FIG. 6 depicts an installer or a technician 620 having an installer device 606 scanning a QR code 640 of a wireless device (e.g., a wireless AP 604). The wireless device 604 depicted in FIG. 6 may be an embodiment of the one or more network devices 104-1, ..., 104-N of the network 150 depicted in FIG. 1, while the installer device 606 depicted in FIG. 6 may be an embodiment of the installer device 106 depicted in FIG. 1. However, the network devices 104-1, ..., 104-N and the installer device 106 depicted in FIG. 1 are not limited to the embodiment shown in FIG. 6. In the embodiment depicted in FIG. 6, the QR code 640 is on a surface of the wireless device 604. For example, the QR code 640 is stamped on, printed on, or attached to a top surface, a bottom surface, and/or a side surface of the wireless device 604. In some embodiments, the QR code 640 of the wireless device 604 is on the packaging (e.g., the box or the wrapper) of the wireless device 604. The installer or technician 620 may use a mobile app installed in the installer device 606, which may be a handheld device, such as a mobile phone or a tablet, to scan the QR code 640 on the wireless device 604 to obtain information related to the wireless device 604. In some embodiments, the information related to the wireless device 604 includes the serial number of the wireless device 604, a device type of the wireless device 604, and/or MAC address information of the wireless device 604. However, QR codes that can be used for the one or more network devices 104-1, ..., 104-N are not limited to the embodiment depicted in FIG. 6. During the scan of the QR code 640 of the wireless device 604, the installer device 606 obtains the location of the wireless device 604, which may include one or more X, Y coordinates and/or Global Positioning System (GPS) coordinates or other global or satellite location system coordinates. In some embodiments, the installer device 606 uses a location module, which may be a GPS receiver or other global or satellite receiver, to obtain the location of the wireless device 604.

Figure 7:
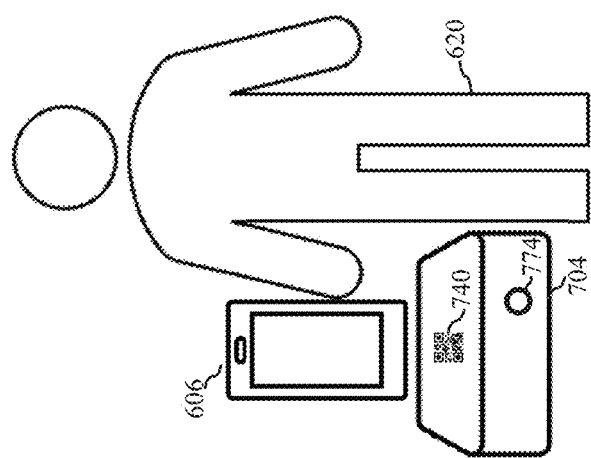
FIG. 7 depicts the installer having the installer device scanning a QR code of a wired network device.

FIG. 7 depicts the installer or technician 620 having the installer device 606 scanning a QR code 740 of a wired network device 704 (e.g., an AS). The wired network device 704 depicted in FIG. 7 may be an embodiment of the one or more network devices 104-1, ..., 104-N of the network 150 depicted in FIG. 1. However, the network devices 104-1, ..., 104-N and the installer device 106 depicted in FIG. 1 are not limited to the embodiment shown in FIG. 7. In some embodiments, the wired communications device is a wired router (e.g., an Ethernet router), a wired switch (e.g., an Ethernet switch), a wired bridge device (e.g., an Ethernet bridge), or a wired hub. In the embodiment depicted in FIG. 7, the QR code 740 is on a surface of the wired network device, which may include a power connection port 774 and at least one communications port (e.g., at least one Ethernet port) (not shown in FIG. 7). For example, the QR code 740 is stamped on, printed on, or attached to a top surface, a bottom surface, and/or a side surface of the wired network device. In some embodiments, the QR code 740 of the wired network device is on the packaging (e.g., the box or the wrapper) of the wired network device. The installer or technician may use a mobile app installed in the installer device 606, which may be a handheld device, such as a mobile phone or a tablet, to scan the QR code 740 on the wired network device to obtain the serial number of the wired network device, a device type of the wired network device, and/or MAC address information of the wired network device. However, QR codes that can be used for the network devices 104-1, ..., 104-N are not limited to the embodiment depicted in FIG. 7. During the scan of the QR code 740 of the wired network device, the installer device 606 obtains the location of the wired network device, which may include one or more X, Y coordinates and/or Global Positioning System (GPS) coordinates or other global or satellite location system coordinates. In some embodiments, the installer device 606 uses a location module, which may be a GPS receiver or other global or satellite receiver, to obtain the location of the wired network device.

Figure 8:
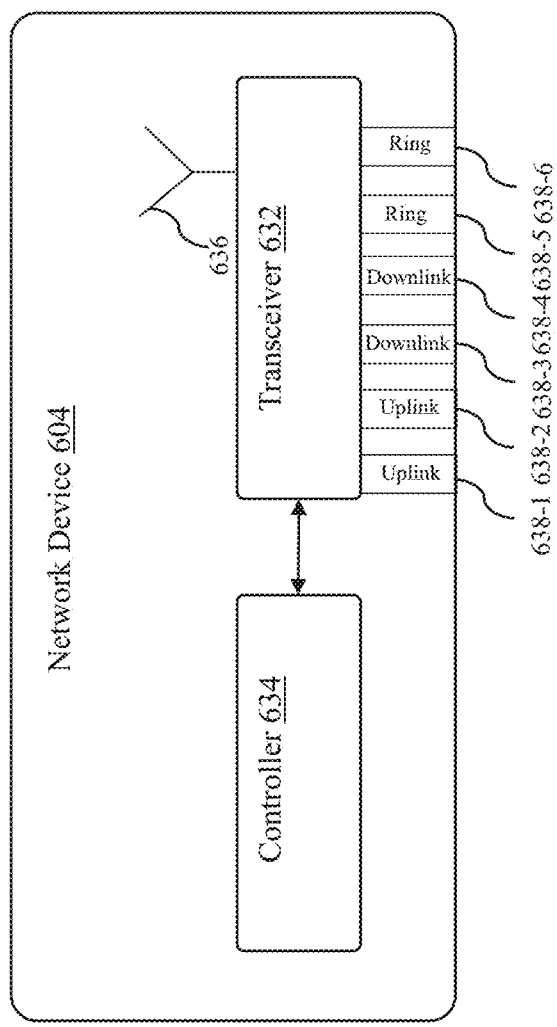
FIG. 8 depicts an embodiment of the wireless network device depicted in FIG. 6.

FIG. 8 depicts an embodiment of the network device 604 depicted in FIG. 6. The network device 604 may be any suitable type of network device. For example, the network device 604 may be a wireless access point (AP). In the embodiment depicted in FIG. 8, the network device 604 includes at least one wireless and/or wired transceiver 632, at least one antenna 636 operably connected to the transceiver 632, six network ports 638-1, 638-2, 638-3, 638-4, 638-5, 638-6 operably connected to the transceiver 632, and a controller 634 operably connected to the transceiver 632. In the six network ports 638-1, 638-2, 638-3, 638-4, 638-5, 638-6, the network ports 638-1, 638-2 are uplink network ports used to connect the network device 604 to uplink network devices, the network ports 638-3, 638-4 are downlink network ports used to connect the network device 604 to downlink network devices, and the network ports 638-5, 638-6 are ring network ports used to connect the network device 604 to network devices that are located in the same network ring as the network device 604. In some embodiments, the transceiver 632 includes a physical layer (PHY) device. The transceivers 632 may be any suitable type of transceiver. For example, the transceiver 632 may be a short-range communications transceiver (e.g., a Bluetooth or Bluetooth Low Energy (BLE) transceiver) or a WLAN transceiver (e.g., a transceiver compatible with an IEEE 802.11 protocol). In some embodiments, the network device 604 includes multiple transceivers, for example, a short-range communications transceiver (e.g., a Bluetooth or BLE transceiver) and a WLAN transceiver (e.g., a transceiver compatible with an IEEE 802.11 protocol). For example, the network device 604 includes a WLAN transceiver (e.g., a transceiver compatible with an IEEE 802.11 protocol) and a short-range communications transceiver (e.g., a Bluetooth or BLE transceiver). In some embodiments, the network device (e.g., a wireless AP) includes multiple antennas and multiple wireless transceivers that share the antennas. In some embodiments, the controller 634 is configured to control the transceiver 632 to process packets received through the antenna 636 and/or the network ports 638-1, 638-2, 638-3, 638-4, 638-5, 638-6 and/or to generate outgoing packets to be transmitted through the antenna 636 and/or the network ports 638-1, 638-2, 638-3, 638-4, 638-5, 638-6. In some embodiments, the controller 634 is configured to obtain and/or store network information relevant to the network device 604. For example, the controller 634 may be configured to obtain and/or store network information (e.g., routing information such as a routing table) relevant to the network device 604. The antenna 636 may be any suitable type of antenna. For example, the antenna 636 may be an induction type antenna such as a loop antenna or any other suitable type of induction type antenna. However, the antenna 636 is not limited to an induction type antenna. The network ports 638-1, 638-2, 638-3, 638-4, 638-5, 638-6 may be any suitable type of ports. For example, the network ports 638-1, 638-2, 638-3, 638-4, 638-5, 638-6 may be local area network (LAN) network ports such as Ethernet ports. However, the network ports 638-1, 638-2, 638-3, 638-4, 638-5, 638-6 are not limited to LAN network ports. Although the illustrated network device 604 is shown with certain components and described with certain functionality herein, other embodiments of the network device 604 may include fewer or more components to implement the same, less, or more functionality. For example, in some embodiments, the network device 604 includes a different number of network port(s) or antenna(s). In another example, although certain number of uplink network ports, downlink network ports, and ring network ports are shown in FIG. 8, in other embodiments, the network device 604 includes different number of uplink network port(s), downlink network port(s), and ring network port(s). For example, in an embodiment, the network device 604 includes more than or less than two uplink network port(s), more than or less than two downlink network port(s), and more than or less than two ring network port(s).

Figure 9:
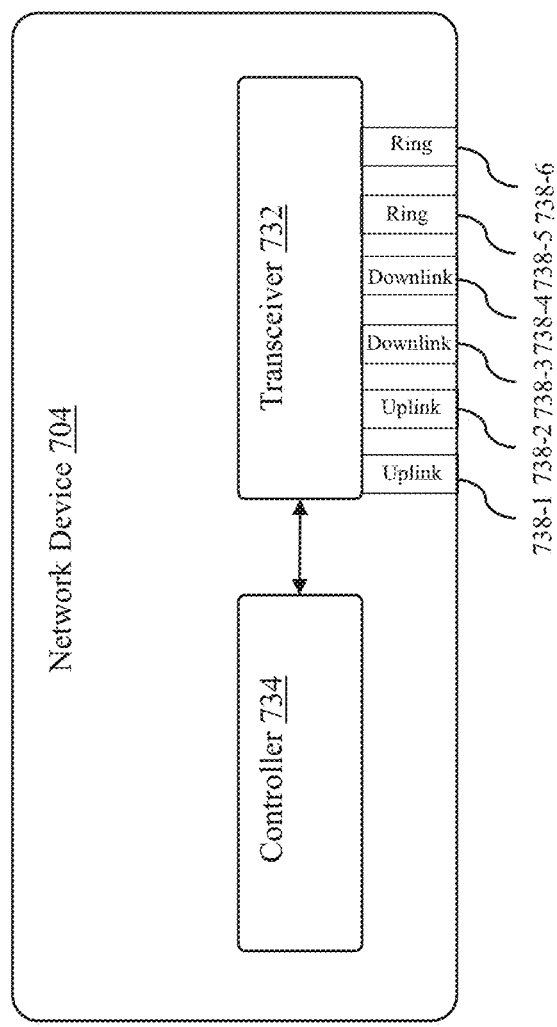
FIG. 9 depicts an embodiment of the wired network device depicted in FIG. 7.

FIG. 9 depicts an embodiment of the network device 704 depicted in FIG. 7. The network device 704 may be any suitable type of network device. For example, the network device 204 may be a distribution switch (DS) or an access switch (AS). In the embodiment depicted in FIG. 9, the network device 704 includes at least one wired transceiver 732, six network ports 738-1, 738-2, 738-3, 738-4, 738-5, 738-6 operably connected to the transceiver 732, and a controller 734 operably connected to the transceiver 732. In the six network ports 738-1, 738-2, 738-3, 738-4, 738-5, 738-6, the network ports 738-1, 738-2 are uplink network ports used to connect the network device 704 to uplink network devices, the network ports 738-3, 738-4 are downlink network ports used to connect the network device 704 to downlink network devices, and the network ports 738-5, 738-6 are ring network ports used to connect the network device 704 to network devices that are located in the same network ring as the network device 704. In some embodiments, the transceiver 732 includes a physical layer (PHY) device. The transceivers 732 may be any suitable type of wired transceiver. For example, the transceiver 732 may an Ethernet transceiver. In some embodiments, the controller 734 is configured to control the transceiver 732 to process packets received through the network ports 738-1, 738-2, 738-3, 738-4, 738-5, 738-6 and/or to generate outgoing packets to be transmitted through the network ports 738-1, 738-2, 738-3, 738-4, 738-5, 738-6. In some embodiments, the controller 734 is configured to obtain and/or store network information relevant to the network device 704. For example, the controller 734 may be configured to obtain and/or store network information (e.g., routing information such as a routing table) relevant to the network device 704. The network ports 738-1, 738-2, 738-3, 738-4, 738-5, 738-6 may be any suitable type of ports. For example, the network ports 738-1, 738-2, 738-3, 738-4, 738-5, 738-6 may be local area network (LAN) network ports such as Ethernet ports. However, the network ports 738-1, 738-2, 738-3, 738-4, 738-5, 738-6 are not limited to LAN network ports. Although the illustrated network device 704 is shown with certain components and described with certain functionality herein, other embodiments of the network device 704 may include fewer or more components to implement the same, less, or more functionality. For example, in some embodiments, the network device 704 includes a different number of network port(s). In another example, although certain number of uplink network ports, downlink network ports, and ring network ports are shown in FIG. 9, in other embodiments, the network device 704 includes different number of uplink network port(s), downlink network port(s), and ring network port(s). For example, in an embodiment, the network device 704 includes more than or less than two uplink network port(s), more than or less than two downlink network port(s), and more than or less than two ring network port(s).

After scanning a network device, an installer connects the network device to one or more other network devices (e.g., previously installed devices or uplink devices) of a network in accordance with a predefined network design of the network 150, e.g., the planned network design 160. Service validation of complex network topologies and device operational status can be difficult especially in real-time when network devices are installed and brought up. In some embodiments, the cloud server 102 (e.g., the device deployment module 110) is configured to make sure that network devices of correct device types are installed with the appropriate pluggables (e.g., power supplies, fans, etc.) and that the network topology conforms with a predefined network design of the network 150, e.g., the planned network design 160 designed during a network planning stage. The cloud server 102 (e.g., the device deployment module 110) can perform automatic network deployment deviation detection of network devices in real time, while an installer is present on-premises (e.g., at the customer site 114) such that if there are any mistake, the mistake can be fixed before the installer leaves the premises (e.g., the customer site 114). For example, the cloud server 102 (e.g., the device deployment module 110) can perform network planning to determine the required topology of HEs, DSs, ASs, wireless APs and sensors for a given enterprise network (e.g., the network 150 depicted in FIG. 1 and/or the network 350 depicted in FIG. 3). As network devices are installed and activated, the network devices are connected to the cloud server 102 (e.g., the device deployment module 110) to report metrics and inventory. In some embodiments, flexibility is allowed on which port(s) a network device that need to be interconnected with the rest of a deployed network to form a planned network topology. The cloud server 102 (e.g., the device deployment module 110) can constantly evaluate network topology deviations in real-time to generate a deviation report, which is presented to an installer such that the installer can fix any deviation. For example, the cloud server 102 (e.g., the device deployment module 110) allows flexibility in defining a network topology such that a port number need not be fixed. In some embodiments, a network device includes multiple groups of ports marked as uplink ports, downlink ports, ring ports. For example, as depicted in FIG. 8, in the network device 604, the network ports 638-1, 638-2 are uplink network ports used to connect the network device 604 to uplink network devices, the network ports 638-3, 638-4 are downlink network ports used to connect the network device 604 to downlink network devices, and the network ports 638-5, 638-6 are ring network ports used to connect the network device 604 to network devices that are located in the same network ring as the network device 604. As depicted in FIG. 9, in the network device 704, the network ports 738-1, 738-2 are uplink network ports used to connect the network device 704 to uplink network devices, the network ports 738-3, 738-4 are downlink network ports used to connect the network device 704 to downlink network devices, and the network ports 738-5, 738-6 are ring network ports used to connect the network device 704 to network devices that are located in the same network ring as the network device 704. When the cloud server 102 (e.g., the device deployment module 110) performs automatic network topology deviation detection of network devices in real time, the cloud server 102 (e.g., the device deployment module 110) does not require a specific network port of a network device to be connected to an uplink device, a downlink device, or another network device that is located in the same network ring as the specific network device. When forming the topology of a network (e.g., the network 150 depicted in FIG. 1 and/or the network 350 depicted in FIG. 3), an installer has the flexibility of using any port within the same group type to be used. For example, an installer can connect the network device 604 to an uplink network device through either of the uplink ports 638-1, 638-2 or connect the network device 704 to an uplink network device through either of the uplink ports 738-1, 738-2 without causing or triggering a network topology deviation. The cloud server 102 (e.g., the device deployment module 110) does not require a network port of a specific port number to be used for a network connection. As long as an uplink port is used for the uplink connectivity, the cloud server 102 (e.g., the device deployment module 110) does not generate a network topology deviation and does not alert an installer to correct the port connection. In addition, an installer can connect the network device 604 to a downlink network device through either of the downlink ports 638-3, 638-4 or connect the network device 704 to an uplink network device through either of the downlink ports 738-3, 738-4 without causing or triggering a network topology deviation. As long as a downlink port is used for the downlink connectivity, the cloud server 102 (e.g., the device deployment module 110) does not generate a network topology deviation and does not alert an installer to correct the port connection. Further, an installer can connect the network device 604 to a network device that is located in the same network ring as the network device 604 through either of the ring ports 638-5, 638-6 or connect the network device 704 to a network device that is located in the same network ring as the network device 704 through either of the ring ports 738-5, 738-6 without causing or triggering a network topology deviation. As long as a ring port is used for the ring connectivity, the cloud server 102 (e.g., the device deployment module 110) does not generate a network topology deviation and does not alert an installer to correct the port connection. An installer can connect network cables or wires to corresponding network ports to form the actual network topology based on the planned topology. As each network cable or wire is connected to one or more corresponding network ports, topology information is dynamically sent to the cloud server 102 (e.g., the device deployment module 110), which allows the cloud server 102 (e.g., the device deployment module 110) to instantaneously calculate the deviations between a planned network topology and the actual network topology. The cloud server 102 (e.g., the device deployment module 110) may calculate a network deployment deviation in such a fashion that actual port numbers do not matter on the interconnected links but rather the logical topology of what is being planned is what is being realized. For example, as long as an uplink port of 10G is connected to a neighbor switch, the cloud server 102 (e.g., the device deployment module 110) does not discriminate which of the uplink ports is used.

Figure 10:
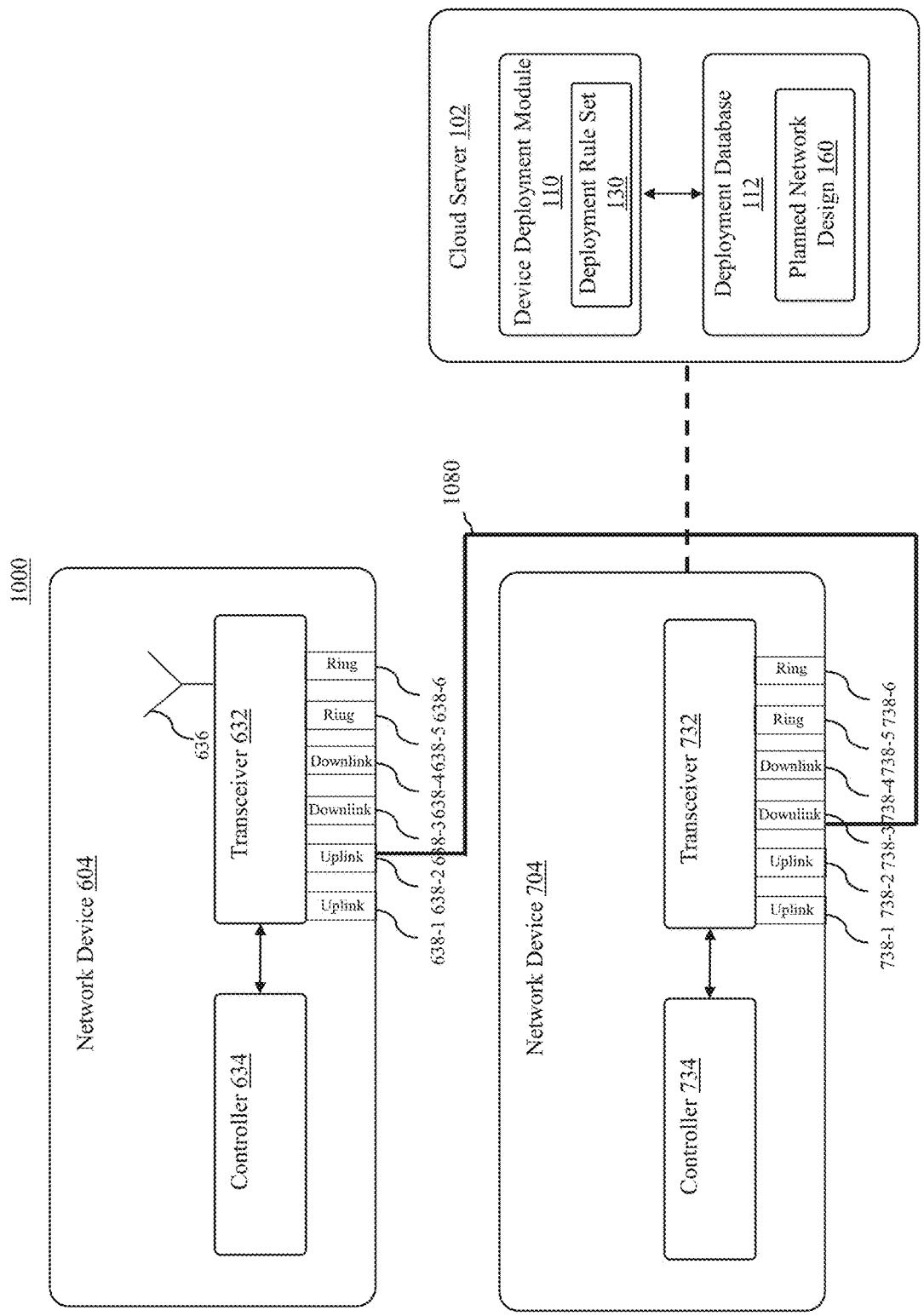
FIG. 10 depicts a network structure that includes the network device depicted in FIG. 8, the network device depicted in FIG. 9, and the cloud server depicted in FIG. 1 as a result of connecting the network devices using a network cable or wire.

FIG. 10 depicts a network structure 1000 that includes the network device 604 depicted in FIG. 8, the network device 704 depicted in FIG. 9, and the cloud server 102 depicted in FIG. 1 as a result of connecting the network device 604 with the network device 704 using a network cable or wire 1080. In the embodiment depicted in FIG. 10, the network device 704 (e.g., an AS, such as, the AS 356-3) is an uplink device to the network device 604 (e.g., a wireless AP, such as, the wireless AP 360-2). Specifically, the downlink port 738-3 of the network device 704 is connected to one end of the network cable 1080, while the uplink port 638-2 of the network device 604 is connected to another end of the network cable 1080. For example, an installer scans the network device 704 (e.g., an AS, such as, the AS 356-3) and connects the network device 704 to the cloud server 102, for example, through another network device (e.g., an AS and/or a DS), and, subsequently, the installer scans the network device 604 (e.g., a wireless AP, such as, the wireless AP 360-2) and connects the network device 604 to the network device 704 using the network cable 1080, for example, according to a planned network design. The cloud server 102 (e.g., the device deployment module 110) does not require a network port of a specific port number to be used for a network connection. The installer may connect the downlink port 738-3 of the network device 704 to one end of the network cable 1080, and connect the uplink port 638-2 of the network device 604 to another end of the network cable 1080. Alternatively, the installer may connect the downlink port 738-3 of the network device 704 to one end of the network cable 1080, and connect the uplink port 638-1 of the network device 604 to another end of the network cable 1080 without causing or triggering a network deployment deviation. Alternatively, the installer may connect the downlink port 738-4 of the network device 704 to one end of the network cable 1080, and connect the uplink port 638-1 of the network device 604 to another end of the network cable 1080 without causing or triggering a network deployment deviation. Alternatively, the installer may connect the downlink port 738-4 of the network device 704 to one end of the network cable 1080, and connect the uplink port 638-2 of the network device 604 to another end of the network cable 1080 without causing or triggering a network deployment deviation. When the network device 604 is connected to the network device 704, which is already connected to the cloud server, the cloud server 102 (e.g., the device deployment module 110) can detect which port of the network device 604 is connected to which port of the network device 704. The cloud server 102 (e.g., the device deployment module 110) can check the port configuration with a planned network design. As long as an uplink port is used for the uplink connectivity, a downlink port is used for the downlink connectivity, a ring port is used for the ring connectivity, the cloud server 102 (e.g., the device deployment module 110) does not generate a network topology deviation and does not alert an installer to correct a related port connection.

Figure 11:
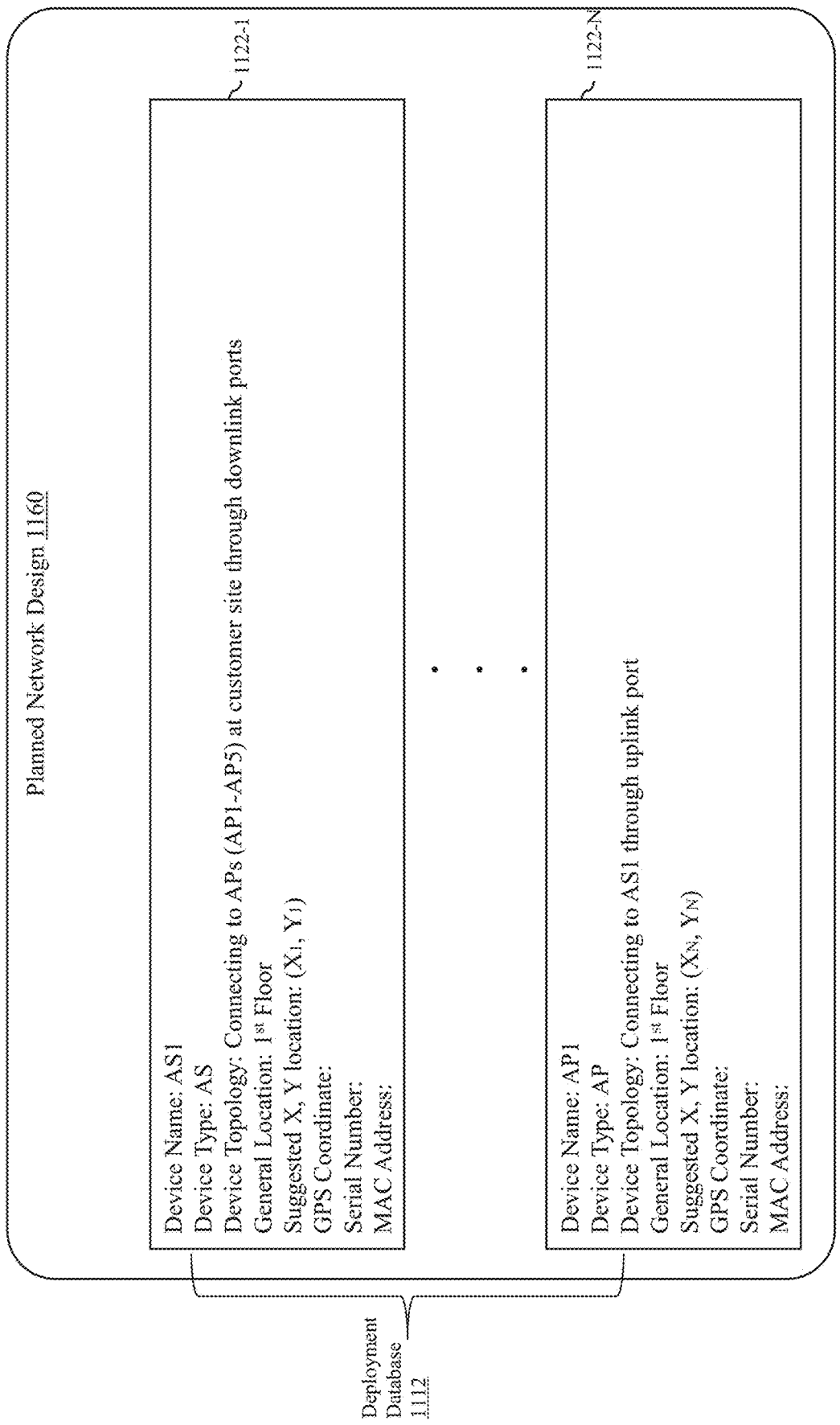
FIG. 11 depicts an embodiment of a deployment database having a planned network design that contains information regarding network devices to be deployed at a customer site.

FIG. 11 depicts an embodiment of the deployment database 112 having the planned network design 160 that contains information regarding network devices to be deployed at the customer site 114. In the embodiment depicted in FIG. 11, a deployment database 1112 includes a planned network design 1160, which contains multiple database entries, 1122-1, . . . , 1122-N, where N is an integer greater than 1. Each of the database entries, 1122-1, . . . , 1122-N, includes device name information of a network device to be deployed at a customer site, device type information of the network device, deployment topology information of the network device, and/or suggested location information (e.g., coordinates on a floor plan) of the network device. For example, the database entry 1122-1 includes device name information (AS) of a network device to be deployed at a customer site, device type information (e.g., AS) of the network device, deployment topology information (e.g., Connecting to APs (AP1-AP5) at customer site through downlink ports) of the network device, location information (first floor of the customer site), suggested or planned X, Y location (e.g., $(X_1, Y_1)$), and blank GPS coordinate, serial number, and MAC address tags of the network device. The database entry 1122-N includes device name information (AP1) of a network device to be deployed at a customer site, device type information (e.g., AP) of the network device, deployment topology information (e.g., Connecting to AS1 through uplink port) of the network device, general location information (first floor of the customer site), suggested or planned X, Y location (e.g., $(X_N, Y_N)$), and blank GPS coordinate, serial number, and MAC address tags. The deployment database 1112 depicted in FIG. 11 is an embodiment of the deployment database 112 depicted in FIG. 1. However, the deployment database 112 depicted in FIG. 1 is not limited to the embodiment shown in FIG. 11. The planned network design 1160 depicted in FIG. 11 is an embodiment of the planned network design 160 depicted in FIG. 1. However, the planned network design 160 depicted in FIG. 1 is not limited to the embodiment shown in FIG. 11.

Figure 12:
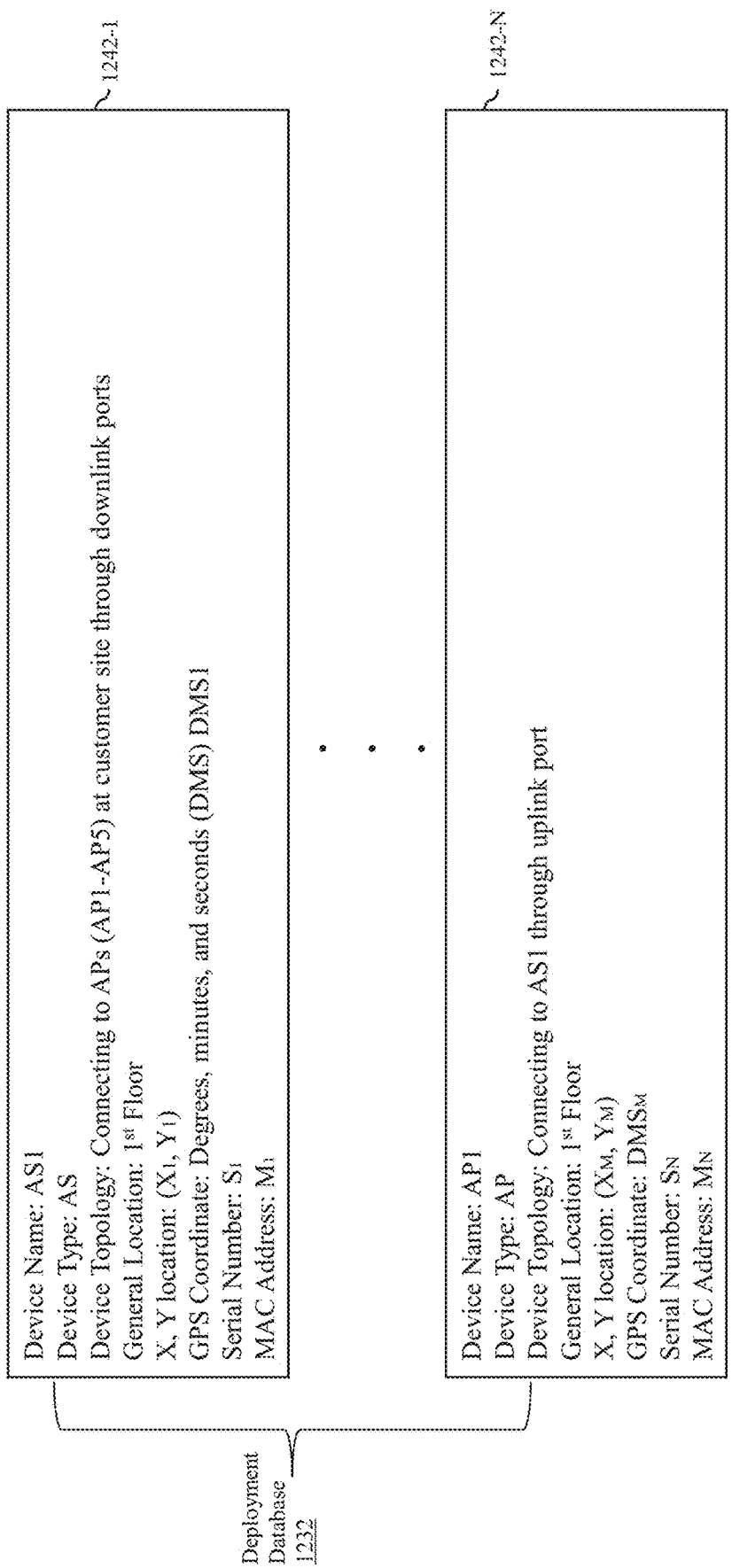
FIG. 12 depicts an embodiment of a deployment database with deployed device information of the communications system depicted in FIG. 1.

FIG. 12 depicts an embodiment of a deployment database 1232 with deployed device information of the communications system 100 depicted in FIG. 1. In the embodiment depicted in FIG. 12, the deployment database 1232 includes multiple database entries, 1242-1, . . . , 1242-N, where N is an integer greater than 1. Each of the database entries, 1242-1, . . . , 1242-N, includes device name information of a deployed network device at a customer site, device type information of the deployed network device, deployment topology information of the deployed network device, general location information (e.g., floor information) of the deployed network device, X, Y location information of the deployed network device, the GPS coordinate of the deployed network device, the serial number of the deployed network device, and/or the MAC address of the deployed network device. The deployment database 1232 may be generated based from the deployment database 1112, for example, by expanding the deployment database 1112 to include the actual installed location information of a deployed network device and/or device specific information of a deployed network device. In some embodiments, based on scanning of network devices during installation, the device deployment module obtains device specific information (e.g., serial numbers and/or MAC addresses of the network devices and location information of the network devices) of network devices that are being installed and, subsequently, dynamically associate the location information of the network devices that are being installed with the network specific information of the network devices that are being installed. For example, the database entry 1242-1 includes device name information (AS1) of a deployed network device at the customer site 114, device type information (e.g., AS) of the deployed network device, deployment topology information (e.g., connecting to APs (AP1-AP5) at customer site through downlink ports) of the deployed network device, general location information (first floor of the customer site) of the deployed network device, the X, Y location (e.g., $(X_1, Y_1)$) of the deployed network device, the GPS coordinate (e.g., degrees, minutes, and seconds (DMS) DMS1) of the deployed network device, the serial number (e.g., $S_1$) of the deployed network device, and the MAC address (e.g., Mi) of the deployed network device. If the information (e.g., location and/or topology information) of the deployed device DS1 is different from information (e.g., location and/or topology information) in the planned network design 160 of the deployed device AS1 stored at the deployment database 1112 shown in FIG. 11, the cloud server 102 (e.g., the device deployment module 110) can alert an installer operating the installer device 106 of such deviations in real-time such that remedial actions can be taken by the installer. The database entry 1142-N includes device name information AP1 of a deployed network device at the customer site, device type information (e.g., AP) of the deployed network device, deployment topology information (e.g., connecting to AS1 through uplink port) of the deployed network device, general location information (first floor of the customer site) of the deployed network device, the X, Y location (e.g., $(X_M, Y_M)$) of the deployed network device, the GPS coordinate (e.g., degrees, minutes, and seconds (DMS) $DMS_N$) of the deployed network device, the serial number (e.g., $S_N$) of the deployed network device, and the MAC address (e.g., $M_N$) of the deployed network device. The location coordinates $(X_M, Y_M)$ of the deployed AP is different from the planned or suggested location coordinates $(X_N, Y_N)$ of the AP AP1. For example, an installer operating the installer device 106 intentionally installs the AP AP1 at location coordinates $(X_M, Y_M)$ instead of suggested location coordinates $(X_N, Y_N)$, to better monitor network conditions. The cloud server 102 (e.g., the device deployment module 110) may alert an installer of such deviations in real-time and the installer may dismiss such alert and inform the cloud server or an operator (e.g., an administrator) at the cloud server his/her intention. The deployment database 1232 depicted in FIG. 12 may be an embodiment of the deployment database 112 depicted in FIG. 1. However, the deployment database 112 depicted in FIG. 1 is not limited to the embodiment shown in FIG. 12.

Figure 13:
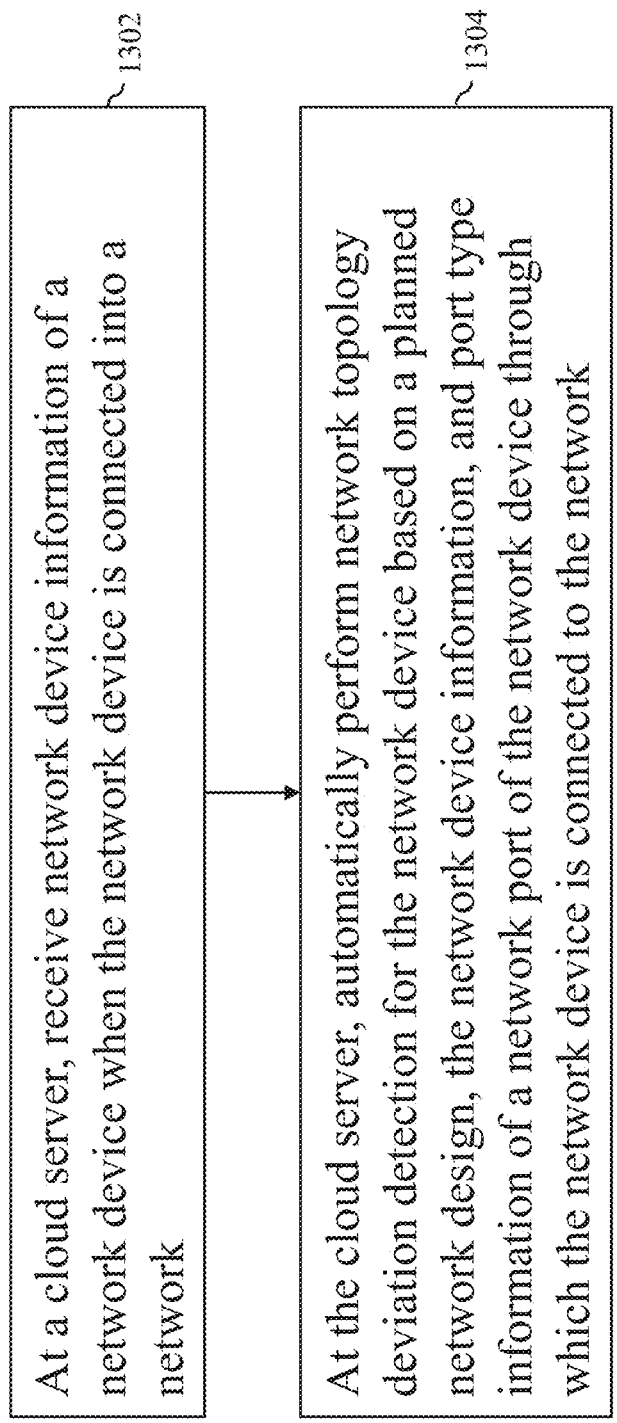
FIG. 13 is a process flow diagram of a method for network deployment in accordance to an embodiment of the invention.

FIG. 13 is a process flow diagram of a method for network deployment in accordance to an embodiment of the invention. According to the method, at block 1302, at a cloud server, network device information of a network device is received when the network device is connected into a network. At block 1304, at the cloud server, network topology deviation detection for the network device is automatically performed based on a planned network design, the network device information, and port type information of a network port of the network device through which the network device is connected to the network. The network device may be similar to, the same as, or a component of the network devices 104-1, . . . , 104-N depicted in FIG. 1, the network device 204 depicted in FIG. 2, the DSs 352-1, 352-2, the HEs 354-1, 354-2, the ASs 356-1, 356-2, 356-3, 356-4, 356-5, 356-6, 356-7, 356-8, the wireless APs 360-1, 360-2, 360-3, 360-4, 360-5, 360-6, and the wireless sensors 362-1, 362-2, 362-3 depicted in FIG. 3, the network device 604 depicted in FIGS. 6 and 8, the network device 704 depicted in FIGS. 7 and 9. The cloud server may be similar to, the same as, or a component of the cloud server 102 depicted in FIG. 1. The network may be similar to, the same as, or a component of the network 150 depicted in FIG. 1 or the network 350 depicted in FIG. 3.

Figure 14:
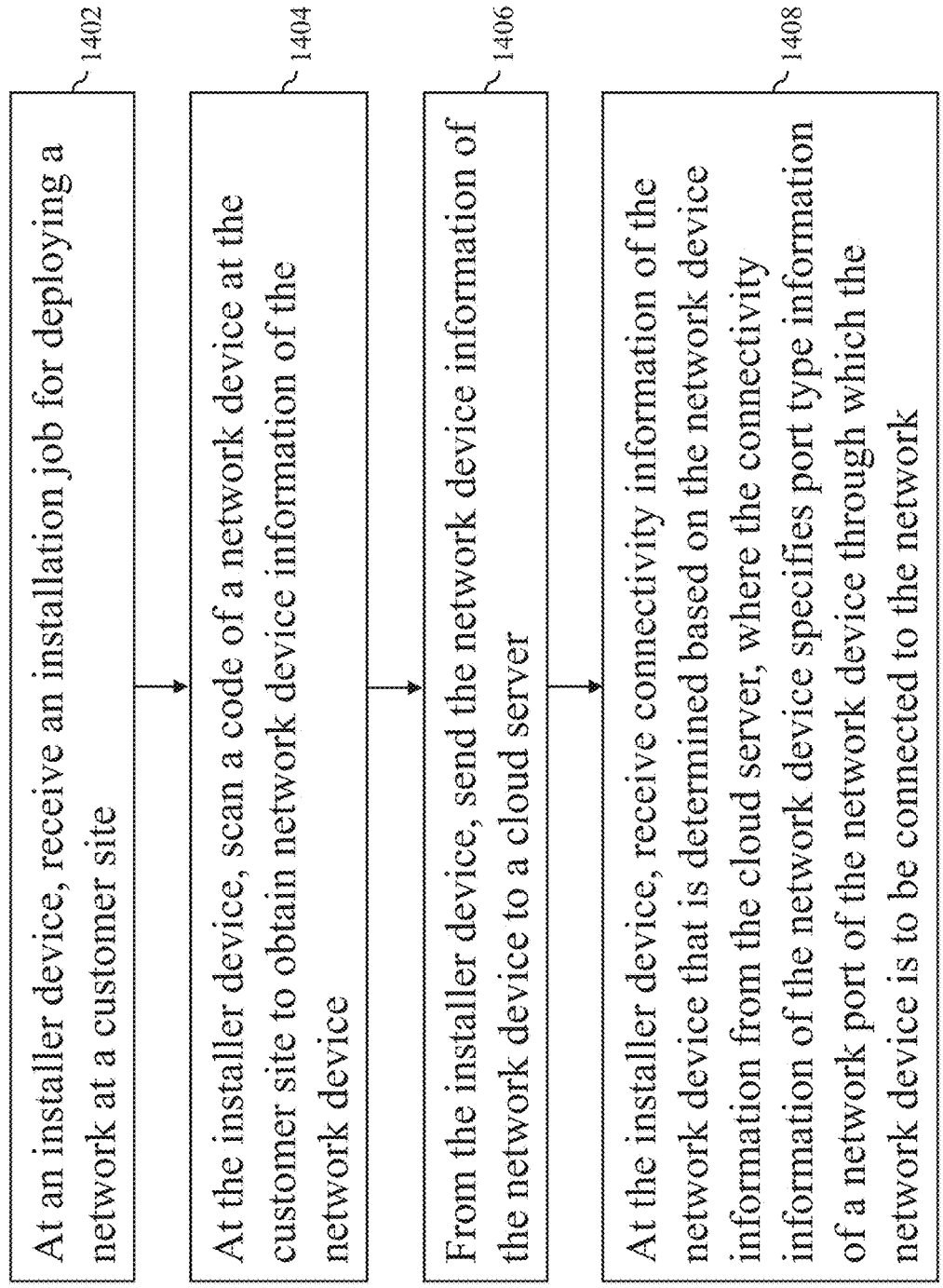
FIG. 14 is a process flow diagram of a method for network deployment in accordance to an embodiment of the invention.

FIG. 14 is a process flow diagram of a method for network deployment in accordance to an embodiment of the invention. According to the method, at block 1402, at an installer device, an installation job for deploying a network at a customer site is received. At block 1404, at the installer device, a code of a network device at the customer site is scanned to obtain network device information of the network device. At block 1406, from the installer device, the network device information of the network device is sent to a cloud server. At block 1408, at the installer device, connectivity information of the network device that is determined based on the network device information is received from the cloud server, where the connectivity information of the network device specifies port type information of a network port of the network device through which the network device is to be connected to the network. The network device may be similar to, the same as, or a component of the network devices 104-1, . . . , 104-N depicted in FIG. 1, the network device 204 depicted in FIG. 2, the DSs 352-1, 352-2, the HEs 354-1, 354-2, the ASs 356-1, 356-2, 356-3, 356-4, 356-5, 356-6, 356-7, 356-8, the wireless APs 360-1, 360-2, 360-3, 360-4, 360-5, 360-6, and the wireless sensors 362-1, 362-2, 362-3 depicted in FIG. 3, the network device 604 depicted in FIGS. 6 and 8, the network device 704 depicted in FIGS. 7 and 9. The installer device may be similar to, the same as, or a component of the installer device 106 depicted in FIG. 1 and/or the installer device 606 depicted in FIG. 6. The cloud server may be similar to, the same as, or a component of the cloud server 102 depicted in FIG. 1. The network may be similar to, the same as, or a component of the network 150 depicted in FIG. 1 or the network 350 depicted in FIG. 3.

Figure 15:
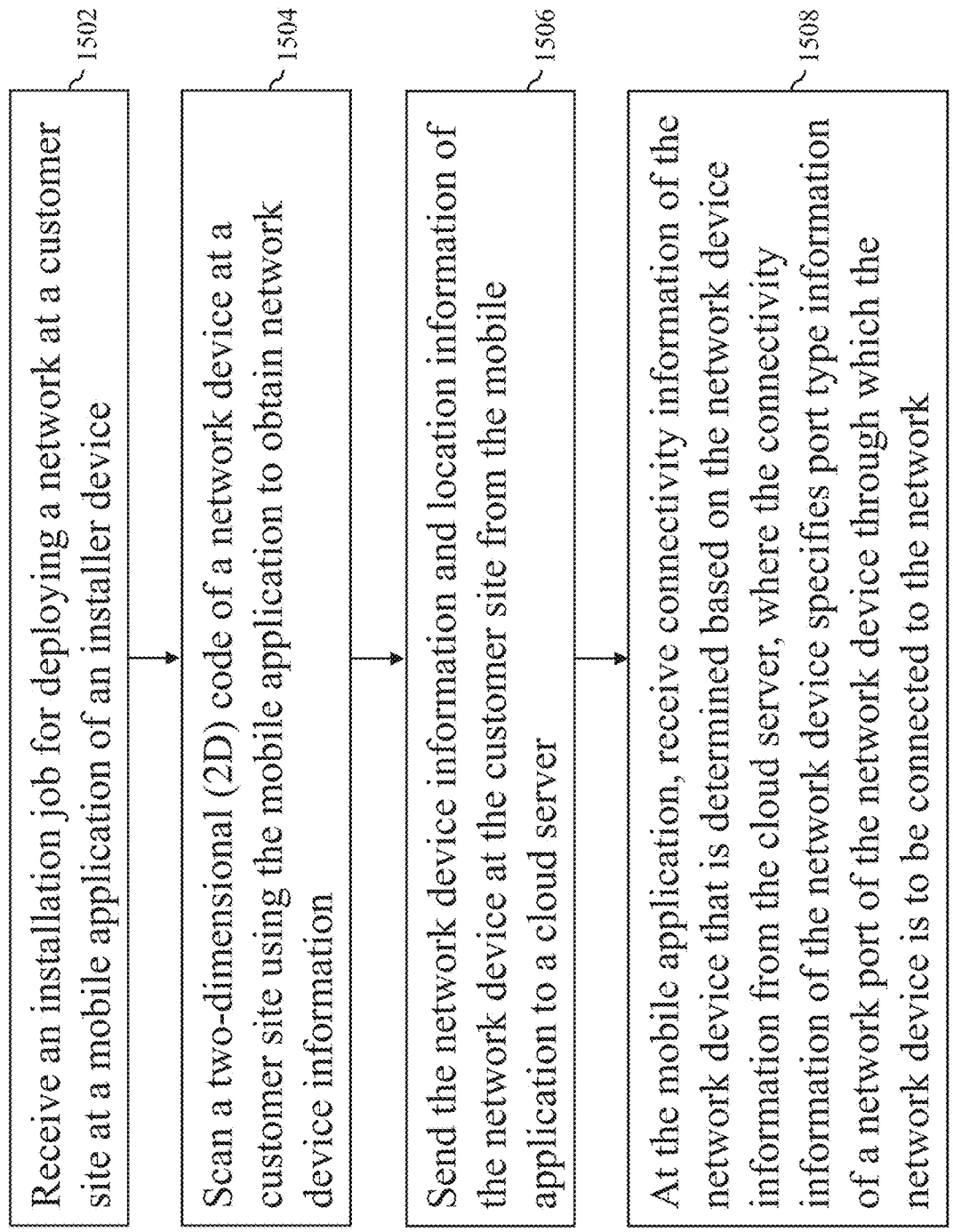
FIG. 15 is a process flow diagram of a method for network deployment in accordance to an embodiment of the invention.

FIG. 15 is a process flow diagram of a method for network deployment in accordance to an embodiment of the invention. According to the method, at block 1502, an installation job for deploying a network at a customer site is received at a mobile application of an installer device. At block 1504, a two-dimensional (2D) code of a network device at a customer site is scanned using the mobile application to obtain network device information. At block 1506, the network device information and location information of the network device at the customer site is sent from the mobile application to a cloud server. At block 1508, at the mobile application, connectivity information of the network device that is determined based on the network device information is received from the cloud server, where the connectivity information of the network device specifies port type information of a network port of the network device through which the network device is to be connected to the network. The network device may be similar to, the same as, or a component of the network devices 104-1, . . . , 104-N depicted in FIG. 1, the network device 204 depicted in FIG. 2, the DSs 352-1, 352-2, the HEs 354-1, 354-2, the ASs 356-1, 356-2, 356-3, 356-4, 356-5, 356-6, 356-7, 356-8, the wireless APs 360-1, 360-2, 360-3, 360-4, 360-5, 360-6, and the wireless sensors 362-1, 362-2, 362-3 depicted in FIG. 3, the network device 604 depicted in FIGS. 6 and 8, the network device 704 depicted in FIGS. 7 and 9. The installer device may be similar to, the same as, or a component of the installer device 106 depicted in FIG. 1 and/or the installer device 606 depicted in FIG. 6. The cloud server may be similar to, the same as, or a component of the cloud server 102 depicted in FIG. 1. The network may be similar to, the same as, or a component of the network 150 depicted in FIG. 1 or the network 350 depicted in FIG. 3.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods described herein may be implemented using software instructions stored on a computer useable storage medium for execution by a computer. As an example, an embodiment of a computer program product includes a computer useable storage medium to store a computer readable program.

The computer-useable or computer-readable storage medium can be an electronic, magnetic, optical, electromagnetic, infrared, or semiconductor system (or apparatus or device). Examples of non-transitory computer-useable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Alternatively, embodiments of the invention may be implemented entirely in hardware or in an implementation containing both hardware and software elements. In embodiments which use software, the software may include but is not limited to firmware, resident software, microcode, etc.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method of network deployment, the method comprising:
at a cloud server, receiving network device information of a network device when the network device is connected into a network; and
at the cloud server, automatically performing network topology deviation detection for the network device based on a planned network design, the network device information, and port type information of a network port of the network device through which the network device is connected to the network,
wherein the network device comprises a plurality of uplink network ports for connecting the network device to a plurality of uplink network devices of the network, a plurality of downlink network ports for connecting the network device to a plurality of downlink network devices of the network, and a plurality of ring network ports for connecting the network device to a plurality of network devices that are located in a same network ring within the network as the network device, and wherein at the cloud server, automatically performing network topology deviation detection for the network device based on the planned network design, the network device information, and the port type information of the network port of the network device through which the network device is connected to the network comprises at the cloud server, reporting a network topology deviation associated with the network device to an operator when the port type information of the network port specifies that the network port is a ring network port, an uplink network port, or a downlink network port while planned port type information specifies the network device to be connected to the network through a network port of another type.

2. The method of claim 1, wherein at the cloud server, automatically performing network topology deviation detection for the network device based on the planned network design, the network device information, and the port type information of the network port of the network device through which the network device is connected to the network comprises at the cloud server, determining planned port type information based on the planned network design and the network device information.

3. The method of claim 1, wherein when the port type information of the network port specifies that the network port is an uplink network port, the planned port type information specifies that the network device is connected to the network through a downlink network port.

4. The method of claim 1, wherein when the port type information of the network port specifies that the network port is an uplink network port, the planned port type information specifies the network device to be connected to the network through a ring network port for connecting the network device to a second network device that is located in a same network ring within the network as the network device.

5. The method of claim 1, wherein when the port type information of the network port specifies that the network port is a downlink network port, the planned port type information specifies the network device to be connected to the network through an uplink network port.

6. The method of claim 1, wherein when the port type information of the network port specifies that the network port is a downlink network port, the planned port type information specifies the network device to be connected to the network through a ring network port for connecting the network device to a second network device that is located in a same network ring within the network as the network device.

7. The method of claim 1, wherein when the port type information of the network port specifies that the network port is a ring network port for connecting the network device to a second network device that is located in a same network ring within the network as the network device, the planned port type information specifies the network device to be connected to the network through an uplink network port.

8. The method of claim 1, wherein when the port type information of the network port specifies that the network port is a ring network port for connecting the network device to a second network device that is located in a same network ring within the network as the network device, the planned port type information specifies the network device to be connected to the network through a downlink network port.

9. The method of claim 1, wherein at the cloud server, automatically performing network topology deviation detection for the network device based on the planned network design, the network device information, and the port type information of the network port of the network device through which the network device is connected to the network comprises at the cloud server, automatically performing network topology deviation detection for the network device based on the planned network design, the network device information, and the port type information of the network port of the network device through which the network device is connected to the network prior to or when a second device is connected to the network.

* * * * *